United States Patent
Du et al.

(10) Patent No.: US 9,693,270 B2
(45) Date of Patent: Jun. 27, 2017

(54) CONTROL DEVICE, CONTROL METHOD, AND COMMUNICATION SYSTEM

(71) Applicant: FUJITSU LIMITED, Kawasaki-shi, Kanagawa (JP)

(72) Inventors: Xiang Du, Kasuga (JP); Tomonari Kagimoto, Fukuoka (JP); Tatsuya Yatsushiro, Fukuoka (JP); Yasushi Shigesada, Fukuoka (JP); Junji Satou, Fukuoka (JP); Tomohide Yamamoto, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 39 days.

(21) Appl. No.: 14/309,707

(22) Filed: Jun. 19, 2014

(65) Prior Publication Data

US 2015/0009822 A1 Jan. 8, 2015

(30) Foreign Application Priority Data

Jul. 2, 2013 (JP) .................................. 2013-139105

(51) Int. Cl.
- *H04W 4/00* (2009.01)
- *H04W 36/00* (2009.01)
- *H04W 84/12* (2009.01)

(52) U.S. Cl.
CPC ........ *H04W 36/0066* (2013.01); *H04W 84/12* (2013.01)

(58) Field of Classification Search
CPC ........................... H04W 36/0066; H04W 84/12
See application file for complete search history.

(56) References Cited

U.S. PATENT DOCUMENTS

| 2004/0045027 A1 | 3/2004 | Takamura et al. |
| 2004/0198469 A1 | 10/2004 | Kurokawa |
| 2005/0085258 A1 | 4/2005 | Ishii et al. |

(Continued)

FOREIGN PATENT DOCUMENTS

| JP | 2003-338856 A | 11/2003 |
| JP | 2004-129163 A | 4/2004 |

(Continued)

OTHER PUBLICATIONS

Japanese Office Action of related Japanese Patent Application No. 2013-139105 dated Feb. 14, 2017.

*Primary Examiner* — Clemence Han
(74) *Attorney, Agent, or Firm* — Arent Fox LLP

(57) ABSTRACT

A control device includes: a memory; and a processor coupled to the memory and configured to: acquire congestion information indicating a congestion state of communication of wireless local area networks (LANs) which are connection destination candidates of a mobile terminal configured to switch a state thereof between a first state and a second state, in the first state the mobile terminal being wirelessly connected to a radio base station of a mobile communication network and not performing a detection operation of a wireless LAN among the wireless LANs, and in the second state the mobile terminal performing the detection operation and being wirelessly connected to a detected wireless LAN, and perform switching control for switching a state of the mobile terminal from the first state to the second state when the congestion information satisfies a given condition.

11 Claims, 29 Drawing Sheets

(56) References Cited

U.S. PATENT DOCUMENTS

| | | | | |
|---|---|---|---|---|
| 2006/0135143 | A1* | 6/2006 | Suematsu | H04W 88/06 455/418 |
| 2007/0008928 | A1* | 1/2007 | Kezys | H04W 36/18 370/331 |
| 2008/0031212 | A1 | 2/2008 | Ogura | |
| 2008/0057956 | A1* | 3/2008 | Black | H04W 48/10 455/435.1 |
| 2008/0167046 | A1* | 7/2008 | Liao | H04W 36/32 455/441 |
| 2008/0186891 | A1 | 8/2008 | Aue | |
| 2008/0200142 | A1* | 8/2008 | Abdel-Kader | H04M 1/72536 455/404.2 |
| 2011/0222523 | A1* | 9/2011 | Fu | H04W 36/22 370/338 |
| 2011/0286329 | A1* | 11/2011 | Koo | H04W 48/12 370/232 |
| 2012/0008595 | A1 | 1/2012 | Wang | |
| 2013/0083661 | A1* | 4/2013 | Gupta | H04W 4/005 370/235 |
| 2014/0079022 | A1* | 3/2014 | Wang | H04W 36/22 370/331 |
| 2014/0133294 | A1* | 5/2014 | Horn | H04W 28/0247 370/230 |
| 2014/0133304 | A1* | 5/2014 | Pica | H04W 48/20 370/232 |
| 2014/0161103 | A1* | 6/2014 | Sirotkin | H04W 24/10 370/332 |
| 2014/0192642 | A1* | 7/2014 | Medapalli | H04W 48/18 370/230 |
| 2014/0233465 | A1* | 8/2014 | Aramoto | H04W 48/18 370/328 |
| 2014/0242979 | A1* | 8/2014 | Belghoul | H04W 28/0231 455/426.1 |
| 2014/0256317 | A1* | 9/2014 | Zhao | H04W 48/10 455/434 |
| 2014/0362689 | A1* | 12/2014 | Koc | H04W 36/22 370/230 |
| 2015/0181491 | A1* | 6/2015 | Van Phan | H04W 28/08 370/331 |
| 2015/0304921 | A1* | 10/2015 | Hong | H04W 36/08 455/436 |
| 2016/0014667 | A1* | 1/2016 | Sirotkin | H04W 76/00 370/252 |
| 2016/0029295 | A1* | 1/2016 | Nagasaka | H04W 48/18 370/237 |
| 2016/0044567 | A1* | 2/2016 | Baghel | H04W 28/08 370/331 |
| 2016/0127967 | A1* | 5/2016 | Liu | H04W 28/08 455/438 |

FOREIGN PATENT DOCUMENTS

| | | |
|---|---|---|
| JP | 2004-312069 A | 11/2004 |
| JP | 2006-033422 A | 2/2006 |
| JP | 2007-028232 A | 2/2007 |
| JP | 2008-042451 A | 2/2008 |
| JP | 2008-294728 A | 12/2008 |
| JP | 2009-503926 A | 1/2009 |
| JP | 2010-028416 A | 2/2010 |
| JP | 2012-520641 A | 9/2012 |

* cited by examiner

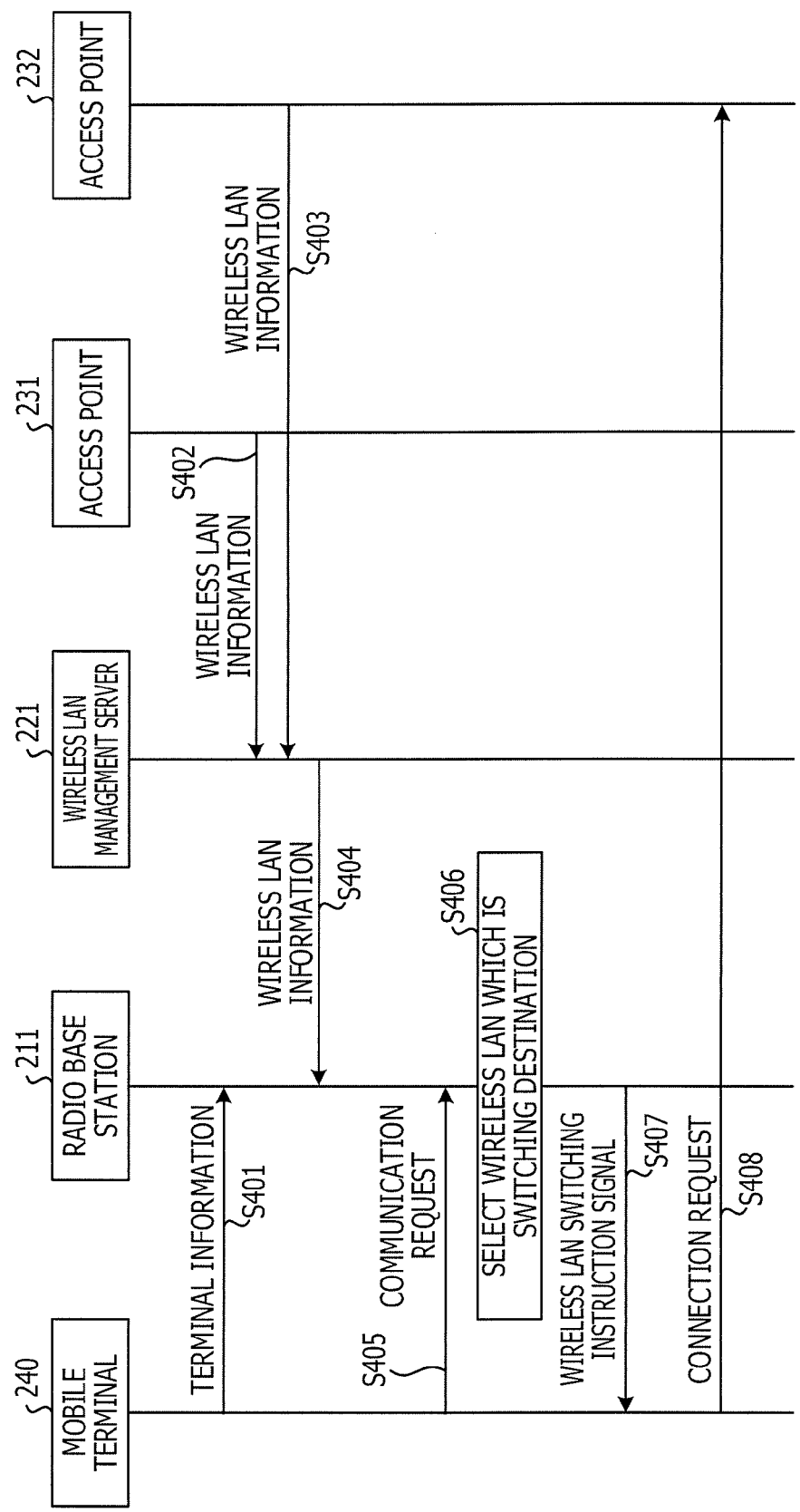

FIG. 6

| QCI | RESOURCE TYPE | PRIORITY | PACKET DELAY BUDGET | PACKET ERROR LOSS RATE | EXAMPLE SERVICES | PROPRIETY OF WIRELESS LAN SWITCHING (SETTING EXAMPLE) |
|---|---|---|---|---|---|---|
| 1 | GBR (BAND IS GUARANTEED) | 2 | 100[ms] | $10^{-2}$ | VoIP | IMPROPER |
| 2 | | 4 | 150[ms] | $10^{-3}$ | VIDEO CALL | IMPROPER |
| 3 | | 3 | 50[ms] | $10^{-3}$ | REAL TIME GAME | PROPER |
| 4 | | 5 | 300[ms] | $10^{-6}$ | STREAMING | PROPER |
| 5 | NON-GBR (BAND IS NOT GUARANTEED) | 1 | 100[ms] | $10^{-6}$ | IMS SIGNALING | IMPROPER |
| 6 | | 7 | 100[ms] | $10^{-3}$ | INTERACTIVE GAME | PROPER |
| 7 | | 6 | | | | PROPER |
| 8 | | 8 | 300[ms] | $10^{-6}$ | TCP PROTOCOL (BROWSING, ELECTRONIC MAIL, FILE DOWNLOAD) | PROPER |
| 9 | | 9 | | | | PROPER |

600

| WIRELESS LAN NAME | WIRELESS LAN_A (802.11a) | WIRELESS LAN_B (802.11b) | WIRELESS LAN_G (802.11g) | ... | WIRELESS LAN_X |
|---|---|---|---|---|---|
| MAXIMAL NUMBER OF TERMINALS | 10 | 50 | 100 | | M |
| CURRENT NUMBER OF TERMINALS | 6 | 46 | 30 | | m |
| MAXIMAL COMMUNICATION RATE [Mbps] | 54 | 11 | 54 | | N |
| CURRENT COMMUNICATION RATE [Mbps] | 15 | 3 | 18 | | m |
| MAXIMAL TRANSMISSION DISTANCE [m] | 50 | 50 | 80 | | Z |
| CURRENT TERMINAL POSITION [m] (DISTANCE WITH WIRELESS LAN) | 40 | 30 | 30 | | Y |

FIG. 11

| WIRELESS LAN NAME | WIRELESS LAN_A (802.11a) | WIRELESS LAN_B (802.11b) | WIRELESS LAN_G (802.11g) | ... | WIRELESS LAN_X |
|---|---|---|---|---|---|
| MAXIMAL NUMBER OF TERMINALS | 10 | 50 | 100 | | M |
| CURRENT NUMBER OF TERMINALS | 6 | 46 | 30 | | m |
| MAXIMAL COMMUNICATION RATE [Mbps] | 54 | 11 | 54 | | N |
| CURRENT COMMUNICATION RATE [Mbps] | 15 | 3 | 18 | | m |
| MAXIMAL TRANSMISSION DISTANCE [m] | 50 | 50 | 80 | | Z |
| CURRENT TERMINAL POSITION [m] (DISTANCE WITH WIRELESS LAN) | 40 | 30 | 30 | | Y |

FIG. 12A

| INFORMATION ELEMENT/GROUP NAME | NEED | MULTI |
|---|---|---|
| MESSAGE TYPE | MP | |
| SSID INFORMATION | MP | |

FIG. 12B

| INFORMATION ELEMENT/GROUP NAME | NEED | MULTI |
|---|---|---|
| SSID INFORMATION | MP | 1 to <maxSSIDNumbers> |
| >SSID | OP | |

FIG. 14

| TERMINAL NAME | CURRENT TERMINAL POSITION | |
|---|---|---|
| | LONGITUDE | LATITUDE |
| USER A | 33.538719588073 | 130.46616160041 |
| USER B | 33.538719588074 | 130.46616160042 |
| USER C | 33.538719588075 | 130.46616160043 |
| ... | | |
| USER X | xx.xxxxxxxxxxx | yyy.yyyyyyyyyy |

| TERMINAL NAME | WIRELESS LAN INFORMATION | | | |
|---|---|---|---|---|
| | SSID-1 | SSID-1 | ... | SSID-1 |
| USER A | a | b | ... | x |
| USER B | a | – | ... | – |
| USER C | c | d | ... | – |
| ... | | | ... | |
| USER X | x | | ... | |

1600

| TERMINAL NAME | TERMINAL MOVEMENT SPEED [km/h] |
|---|---|
| USER A | 20 |
| USER B | 0 |
| USER C | 5 |
| ... | |
| USER X | x |

FIG. 22

| WIRELESS LAN NAME | MAXIMAL NUMBER OF TERMINALS | CURRENT NUMBER OF TERMINALS | MAXIMAL COMMUNICATION RATE [Mbps] | CURRENT COMMUNICATION RATE [Mbps] | MAXIMAL COMMUNICATION RATE [m] |
|---|---|---|---|---|---|
| WIRELESS LAN_A (802.11a) | 10 | 8 | 54 | 15 | 50 |
| WIRELESS LAN_B (802.11b) | 50 | 50 | 11 | 3 | 50 |
| WIRELESS LAN_G (802.11g) | 100 | 30 | 100 | 18 | 80 |
| ... | | | | | |
| WIRELESS LAN_X | M | m | N | m | Y |

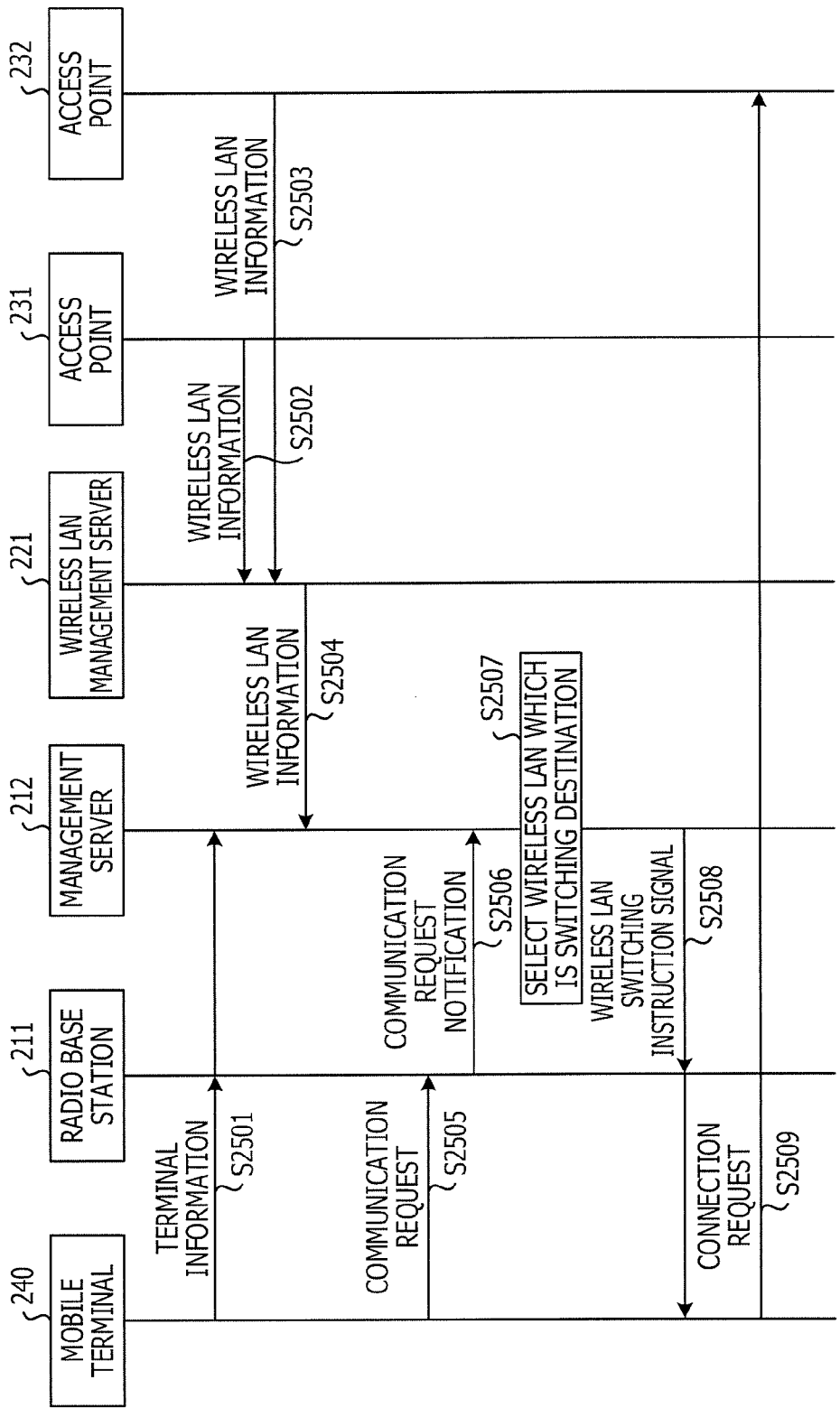

CONTROL DEVICE, CONTROL METHOD, AND COMMUNICATION SYSTEM

CROSS-REFERENCE TO RELATED APPLICATION

This application is based upon and claims the benefit of priority from the prior Japanese Patent Application No. 2013-139105 filed on Jul. 2, 2013, the entire contents of which are incorporated herein by reference.

FIELD

The embodiments described herein are related to a control device, a control method, and a communication system.

BACKGROUND

In recent years, the traffic of a mobile communication network has been increased every year due to speeding-up of a mobile network, improvement in performance of a mobile terminal, an increase in the number of mobile terminals, and the like. In addition, the traffic increase of the mobile communication network is accelerated along with the spread of smart phones or the like.

Meanwhile, in a communication carrier, an attempt is made to offload the traffic to a wireless local area network (LAN) by using a hot spot of the wireless LAN such as Wireless-Fidelity (Wi-Fi: registered trademark).

Switching between turning-on and off of a wireless LAN function in a mobile terminal is performed by a manual operation of a user. For example, when the wireless LAN function is turned on, the mobile terminal detects an access point of a wireless LAN, and automatically switches a communication path thereof to the wireless LAN in a case where the access point of the wireless LAN is found.

However, if the wireless LAN function is turned on, power consumption increases due to a detection operation of an access point, and thus many users turn off the wireless LAN function. In relation thereto, a technique is known in which turning-on and off of the wireless LAN function are automatically controlled with detection of communication using a predetermined protocol as a trigger (for example, refer to Japanese Laid-Open Patent Publication No. 2004-312069, Japanese National Publication of International Patent Application No. 2009-503926, and Japanese Laid-Open Patent Publication No. 2010-028416).

SUMMARY

According to an aspect of the invention, a control device includes: a memory; and a processor coupled to the memory and configured to: acquire congestion information indicating a congestion state of communication of wireless local area networks (LANs) which are connection destination candidates of a mobile terminal configured to switch a state thereof between a first state and a second state, in the first state the mobile terminal being wirelessly connected to a radio base station of a mobile communication network and not performing a detection operation of a wireless LAN among the wireless LANs, and in the second state the mobile terminal performing the detection operation and being wirelessly connected to a detected wireless LAN, and perform switching control for switching a state of the mobile terminal from the first state to the second state when the congestion information satisfies a given condition.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a sequence diagram illustrating an example of a process in the communication system;

FIG. 6 is a diagram illustrating an example of setting of the propriety of wireless LAN switching;

FIG. 11 is a diagram illustrating an example of an extraction result due to the second extraction process of a wireless LAN;

FIG. 12A is a diagram illustrating an example of a format of a wireless LAN switching instruction signal;

FIG. 12B is a diagram illustrating an example of connectable wireless LAN information;

FIG. 14 is a diagram illustrating an example of a terminal position information table;

FIG. 16 is a diagram illustrating an example of a connectable wireless LAN information table;

FIG. 22 is a diagram illustrating an example of a wireless LAN congestion information table;

FIG. 25 is a sequence diagram illustrating an example of a process in the communication system.

DESCRIPTION OF EMBODIMENTS

Hereinafter, with reference to the drawings, a detailed description will be made of a control device, a control method, and a communication system according to the embodiments.

While inventing the present embodiments, observations were made regarding a related art. Such observations include the following, for example.

In the related art, for example, when a wireless LAN which is a switching destination is in a congestion state, there is a case where communication quality of a mobile terminal deteriorates after the switching to the wireless LAN is performed.

Therefore, in one aspect, an object of the disclosure is to provide a control device, a control method, and a communication system capable of minimizing deterioration in communication quality.

Embodiment 1

Figure 1A:
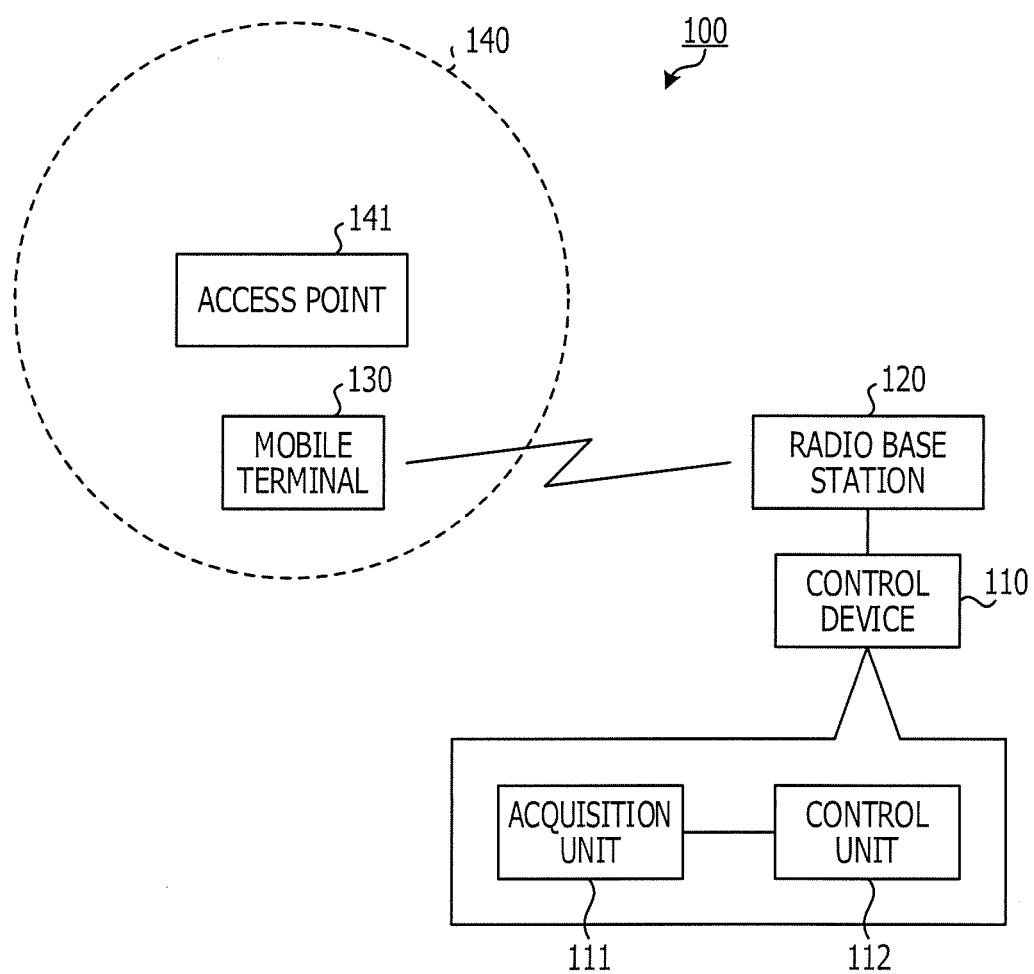
FIG. 1A is a diagram illustrating an example of a communication system according to Embodiment 1.
Figure 1B:
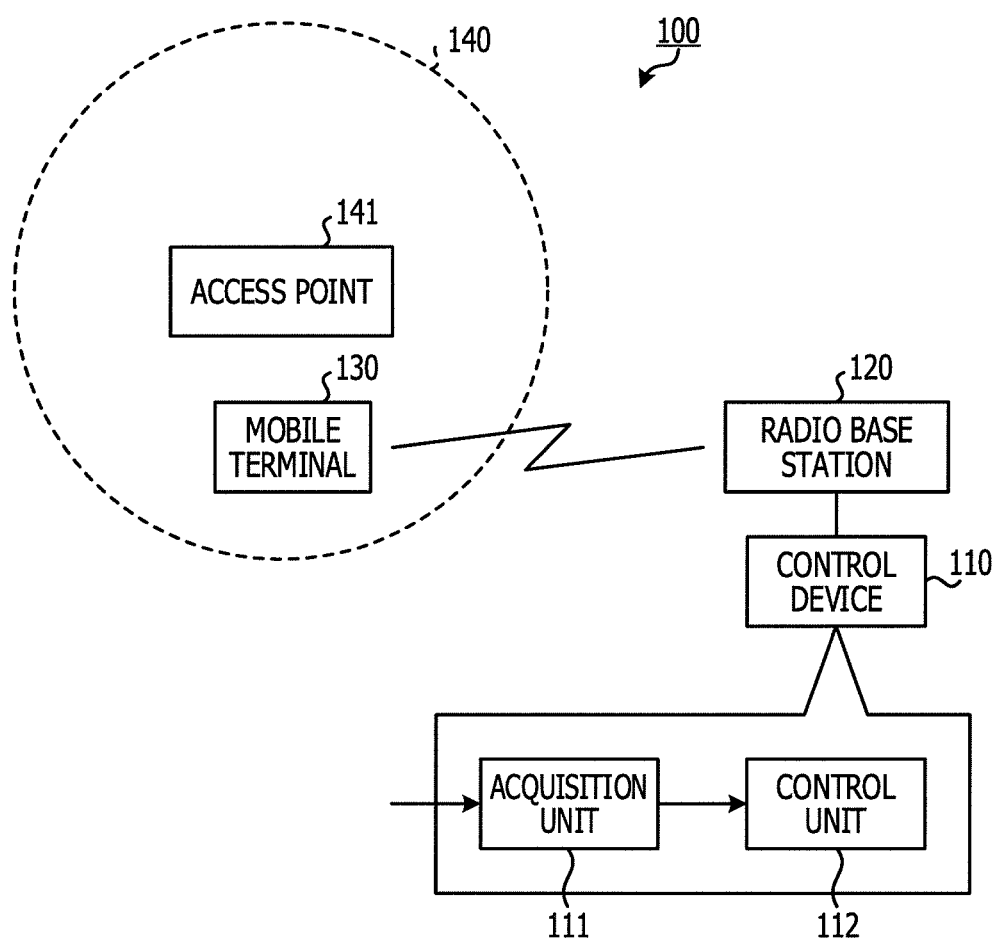
FIG. 1B is a diagram illustrating an example of a flow of information in the communication system illustrated in FIG. 1A.

FIG. 1A is a diagram illustrating an example of a communication system according to Embodiment 1. FIG. 1B is a diagram illustrating an example of a flow of information in the communication system illustrated in FIG. 1A. As illustrated in FIGS. 1A and 1B, the communication system 100 according to Embodiment 1 includes a control device 110, a radio base station 120, a mobile terminal 130, and an access point 141.

The radio base station 120 is a radio base station of a mobile communication network. The mobile terminal 130 is wirelessly connected to the radio base station 120, and thus can be connected to a wide area network (for example, the Internet) via a radio access network (RAN). In addition, the mobile terminal 130 is wirelessly connected to a wireless LAN 140 which is formed by the access point 141, and thus can be connected to a wide area network via the access point 141.

Further, the mobile terminal 130 can perform a detection operation of detecting the surrounding wireless LAN 140. The mobile terminal 130 can switch its state between a first state in which the detection operation of the wireless LAN 140 is not performed, and a second state in which the detection operation of the wireless LAN 140 is performed and wireless connection to the wireless LAN 140 detected through the detection operation is performed, based on control from an external device of the mobile terminal 130. In the state illustrated in FIGS. 1A and 1B, it is assumed that the mobile terminal 130 is in the first state and is wirelessly connected to the radio base station 120.

The control device 110 is, for example, a control device which is provided in the radio base station 120. Alternatively, the control device 110 may be provided in a control device which can communicate with the radio base station 120. The control device 110 includes an acquisition unit 111 and a control unit 112. The acquisition unit 111 acquires congestion information indicating a congestion state of communication of the wireless LAN 140 which is a connection destination candidate of the mobile terminal 130. For example, the acquisition unit 111 receives the congestion information from the wireless LAN 140 or a communication device which can communicate with the wireless LAN 140. The acquisition unit 111 outputs the acquired congestion information to the control unit 112.

The control unit 112 performs switching control for switching a state of the mobile terminal 130 from the first state to the second state according to whether or not the congestion information output from the acquisition unit 111 satisfies a predetermined condition. The predetermined condition is that, for example, the congestion information indicates an extent of communication congestion in the wireless LAN 140 being in a specific level or higher.

The control unit 112 performs the switching control when the congestion information output from the acquisition unit 111 satisfies the predetermined condition. For example, the control unit 112 transmits a switching instruction signal to the mobile terminal 130 by using wireless communication performed by the radio base station 120, so as to perform the switching control. If the switching control is performed by the control unit 112, the mobile terminal 130 performs a detection operation of a wireless LAN so as to detect the wireless LAN 140, and is wirelessly connected to the wireless LAN 140 (the access point 141). Accordingly, the mobile terminal 130 can start connection to a wide area network via the wireless LAN 140.

The control unit 112 does not perform the switching control in a case where the congestion information output from the acquisition unit 111 does not satisfy the predetermined condition. In this case, the mobile terminal 130 continues to be connected to the wide area network via the radio base station 120.

As mentioned above, in the control device 110 according to Embodiment 1, by using the congestion information of the wireless LAN 140 which is a connection destination candidate of the mobile terminal 130, the mobile terminal 130 can be connected to the wireless LAN 140 in a case where communication of the wireless LAN 140 is not in a congestion state. Accordingly, it is possible to offload communication of the mobile terminal 130 to the wireless LAN 140 and to minimize deterioration in communication quality of the mobile terminal 130 due to the offloading.

Switching Control Based on Movement Speed of Mobile Terminal

The acquisition unit 111 may acquire movement speed information indicating a movement speed of the mobile terminal 130. For example, the acquisition unit 111 may acquire movement speed information from the mobile terminal 130 by using wireless communication performed by the radio base station 120. The acquisition unit 111 outputs the acquired movement speed information to the control unit 112.

The control unit 112 performs the switching control based on the movement speed information and the congestion information output from the acquisition unit 111. For example, the control unit 112 does not perform the switching control even if the congestion information satisfies the predetermined condition in a case where a movement speed of the mobile terminal 130 indicated by the movement speed information is a predetermined speed or higher.

Accordingly, the mobile terminal 130 is not made to be connected to the wireless LAN 140 in a case where the mobile terminal 130 is unable to be wirelessly connected to the wireless LAN 140 in a short time even if wirelessly connected to the wireless LAN 140. For this reason, it is possible to minimize deterioration in communication quality of the mobile terminal 130 due to the offloading.

Designation of Wireless LAN as Connection Destination

The control unit 112 may select the wireless LAN 140 which is to be connected to the mobile terminal 130 from among a plurality of wireless LANs 140 in a case where there are the plurality of wireless LANs 140 as connection destination candidates of the mobile terminal 130. For example, the control unit 112 selects a wireless LAN in which communication congestion is relatively less from the plurality of wireless LANs 140.

In addition, the control unit 112 notifies the mobile terminal 130 of the selected wireless LAN 140 so that the mobile terminal 130 is connected to the selected wireless LAN 140. For example, the control unit 112 stores identification information of the selected wireless LAN 140 in a switching instruction signal which is transmitted by using wireless communication performed by the radio base station 120, so as to notify the mobile terminal 130 of the selected wireless LAN 140.

Therefore, in a case where there are a plurality of wireless LANs 140 as connection destination candidates of the mobile terminal 130, the wireless LAN 140 in which congestion is less is designated and is connected to the mobile terminal 130, and thus it is possible to improve communication quality of the mobile terminal 130 in an offloading destination.

Determination of Congestion Based on the Number of Connected Mobile Terminals

For example, the congestion information acquired by the acquisition unit 111 includes connection state information indicating a difference (for example, a ratio) between the maximal number of mobile terminals which can be simultaneously connected to the wireless LAN 140 and the number of mobile terminals connected to the wireless LAN 140. In addition, the control unit 112 performs the switching control if the connection state information satisfies a predetermined condition, and does not perform the switching control if the connection state information does not satisfy the predetermined condition.

For example, the control unit 112 performs the switching control in a case where a proportion of the number of mobile terminals connected to the wireless LAN 140 to the maximal number of mobile terminals which can be simultaneously connected to the wireless LAN 140 is lower than a predetermined proportion. In addition, the control unit 112 does not perform the switching control in a case where a proportion of the number of mobile terminals connected to the wireless LAN 140 to the maximal number of mobile terminals which can be simultaneously connected to the wireless LAN 140 is equal to or higher than the predetermined proportion. Accordingly, the mobile terminal 130 can be connected to the wireless LAN 140 in a case where communication of the wireless LAN 140 which is a connection destination candidate is not in a congestion state.

Determination of Congestion Based on Currently Used Communication Band

For example, the congestion information acquired by the acquisition unit 111 may include band state information indicating a difference (for example, a ratio) between a maximal communication band (communication rate) of the wireless LAN 140 and a communication band which is currently used by the wireless LAN 140. In addition, the control unit 112 performs the switching control in a case where the band state information satisfies a predetermined condition, and does not perform the switching control in a case where the band state information does not satisfy the predetermined condition.

For example, the control unit 112 performs the switching control in a case where a ratio of a communication band which is currently used by the wireless LAN 140 to a maximal communication band of the wireless LAN 140 is lower than a predetermined ratio. In addition, the control unit 112 does not perform the switching control in a case where a ratio of a communication band which is currently used by the wireless LAN 140 to a maximal communication band of the wireless LAN 140 is equal to or higher than the predetermined ratio. Accordingly, the mobile terminal 130 can be connected to the wireless LAN 140 in a case where communication of the wireless LAN 140 which is a connection destination candidate is not in a congestion state.

Switching Control Based on Distance between Mobile Terminal and Wireless LAN

The acquisition unit 111 may acquire distance information indicating a difference between a distance between the wireless LAN 140 and the mobile terminal 130, and a wireless transmission distance of the wireless LAN 140. The wireless transmission distance is, for example, a distance with the wireless LAN 140 at which wireless communication can be performed with the wireless LAN 140. The acquisition unit 111 outputs the acquired distance information to the control unit 112. For example, the acquisition unit 111 calculates the distance information based on information indicating a position of the mobile terminal 130, information indicating a position of the wireless LAN 140, and information indicating a wireless transmission distance of the wireless LAN 140.

For example, the acquisition unit 111 may receive the information indicating a position of the mobile terminal 130 from the mobile terminal 130 by using wireless communication performed by the radio base station 120. In addition, the acquisition unit 111 may receive the information indicating a position of the wireless LAN 140 and the information indicating a wireless transmission distance of the wireless LAN 140 from the wireless LAN 140 or a communication device which can communicate with the wireless LAN 140. Alternatively, the information indicating a position of the wireless LAN 140 and the wireless transmission distance of the wireless LAN 140 may be stored in a memory of the control device 110 in advance.

The control unit 112 performs the switching control based on the distance information and the congestion information output from the acquisition unit 111. For example, the control unit 112 does not perform the switching control even if the congestion information satisfies a predetermined condition in a case where a ratio of the distance between the wireless LAN 140 and the mobile terminal 130 to the wireless transmission distance of the wireless LAN 140 is equal to or higher than a predetermined ratio.

Accordingly, the mobile terminal 130 is not made to be connected to the wireless LAN 140 in a case where high communication quality is not predicted to be obtained even if wirelessly connected to the wireless LAN 140. For this reason, it is possible to minimize deterioration in communication quality of the mobile terminal 130 due to the offloading.

Trigger of Switching Control

For example, the control unit 112 performs the switching control with the occurrence of a communication request from the mobile terminal 130 to a radio base station as a trigger. Therefore, in a case where there is a communication request and the congestion information satisfies a predetermined condition, a state of the mobile terminal 130 is switched to the second state, and thus the mobile terminal 130 can make a request for communication with the wireless LAN 140. For this reason, it is possible to avoid an unstable state of communication of the mobile terminal 130 due to the offloading.

The control unit 112 may monitor a bearer type (service type) of communication between the radio base station 120 and the mobile terminal 130. In addition, the control unit 112 performs the switching control in a case where a bearer type of communication between the radio base station 120 and the mobile terminal 130 is a predetermined bearer type, and the congestion information satisfies a predetermined condition. Accordingly, in a case where switching to the wireless LAN 140 is not proper, for example, since a bearer type of communication has to have a real time property, the mobile terminal 130 is not made to be connected to the wireless LAN 140.

The control unit 112 may monitor a protocol of communication between the radio base station 120 and the mobile terminal 130. In addition, the control unit 112 performs the switching control in a case where a protocol of communication between the radio base station 120 and the mobile terminal 130 is a predetermined protocol, and the congestion information satisfies a predetermined condition. Accordingly, in a case where switching to the wireless LAN 140 is not proper, for example, since a protocol of communication has to have a real time property, the mobile terminal 130 is not made to be connected to the wireless LAN 140.

Embodiment 2

Communication System According to Embodiment 2

Figure 2:
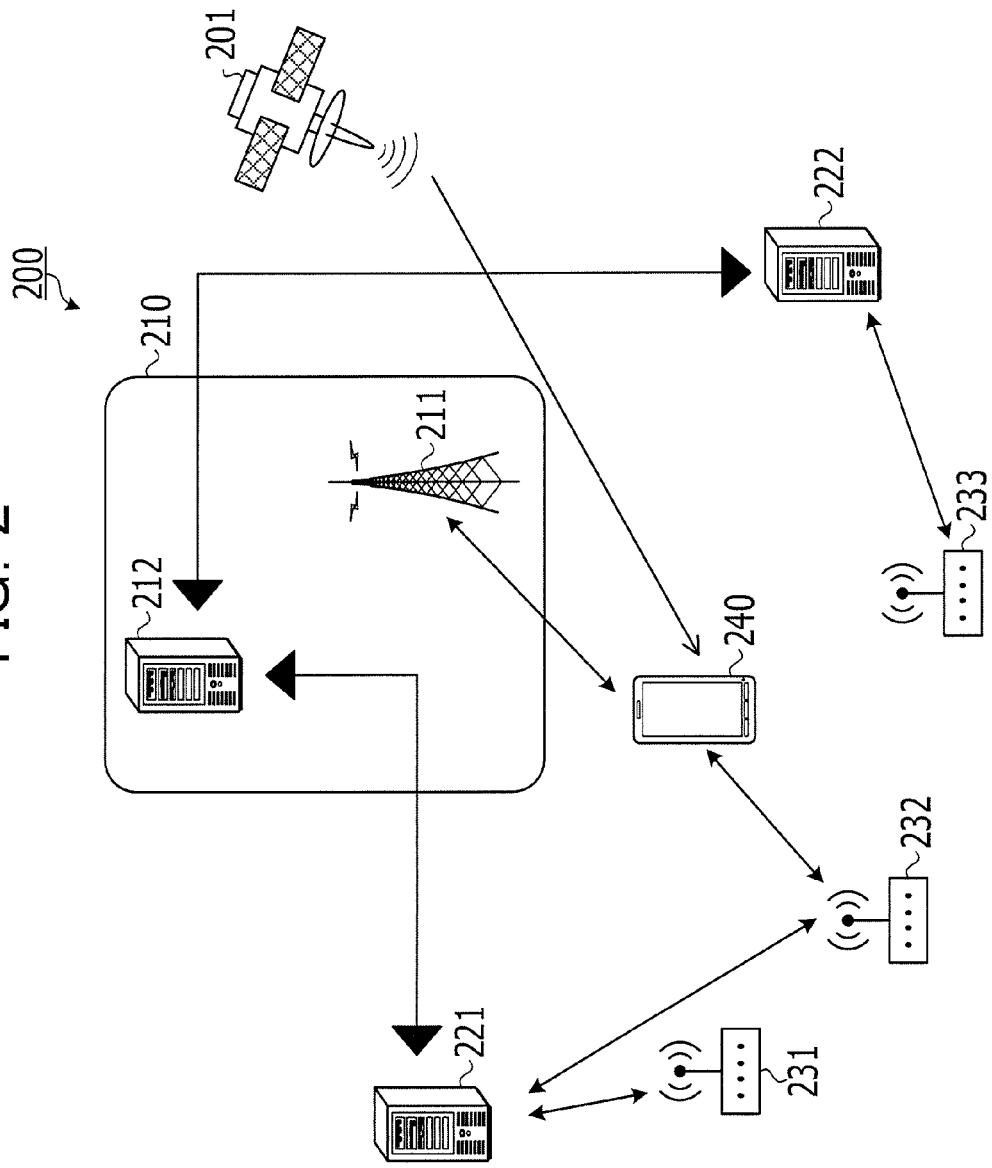
FIG. 2 is a diagram illustrating an example of a communication system according to Embodiment 2.

FIG. 2 is a diagram illustrating an example of a communication system according to Embodiment 2. As illustrated in FIG. 2, a communication system 200 according to Embodiment 2 includes a radio base station 211, a management server 212, wireless LAN management servers 221 and 222, access points (APs) 231 to 233, and a mobile terminal 240.

The radio base station 120 illustrated in FIGS. 1A and 1B can be realized by, for example, the radio base station 211. The mobile terminal 130 illustrated in FIGS. 1A and 1B can be realized by, for example, the mobile terminal 240. The wireless LAN 140 illustrated in FIGS. 1A and 1B can be realized by, for example, the access points 231 to 233.

The control device 110 illustrated in FIGS. 1A and 1B can be realized by, for example, the radio base station 211. Alternatively, the control device 110 illustrated in FIGS. 1A and 1B may be realized by, for example, the management server 212. In Embodiment 2, a description will be made of a case where the control device 110 illustrated in FIGS. 1A and 1B is realized by the radio base station 211.

The radio base station 211 and the management server 212 are provided in a RAN 210. The radio base station 211 is a base station which can perform wireless communication with the mobile terminal 240. The management server 212 is a server which can perform communication with the radio base station 211. In addition, the management server 212 is a server which can perform communication with, for example, the wireless LAN management servers 221 and 222.

The wireless LAN management server 221 is a server which manages the access points 231 and 232. The wireless LAN management server 222 is a server which manages the access point 233. The access points 231 to 233 are access points which form wireless LANs which can be connected to the mobile terminal 240.

When a wireless LAN function is turned on, the mobile terminal 240 performs a detection operation of access points (for example, the access points 231 to 233) which can perform wireless communication with the mobile terminal 240. In addition, when an access point which can perform wireless communication with the mobile terminal 240 is detected, the mobile terminal 240 is wirelessly connected to the detected access point.

On the other hand, in a case where an access point which can perform wireless communication with the mobile terminal 240 is not detected, the mobile terminal 240 performs wireless communication with, for example, the radio base station 211. In addition, when the wireless LAN function is turned off, the mobile terminal 240 does not perform the detection operation of the access points 231 to 233, and performs wireless communication with, for example, the radio base station 211.

The mobile terminal 240 may measure positional information of the mobile terminal 240 by receiving a signal from a GPS satellite 201 of a Global Positioning System (GPS).

Radio Base Station According to Embodiment 2

Figure 3A:
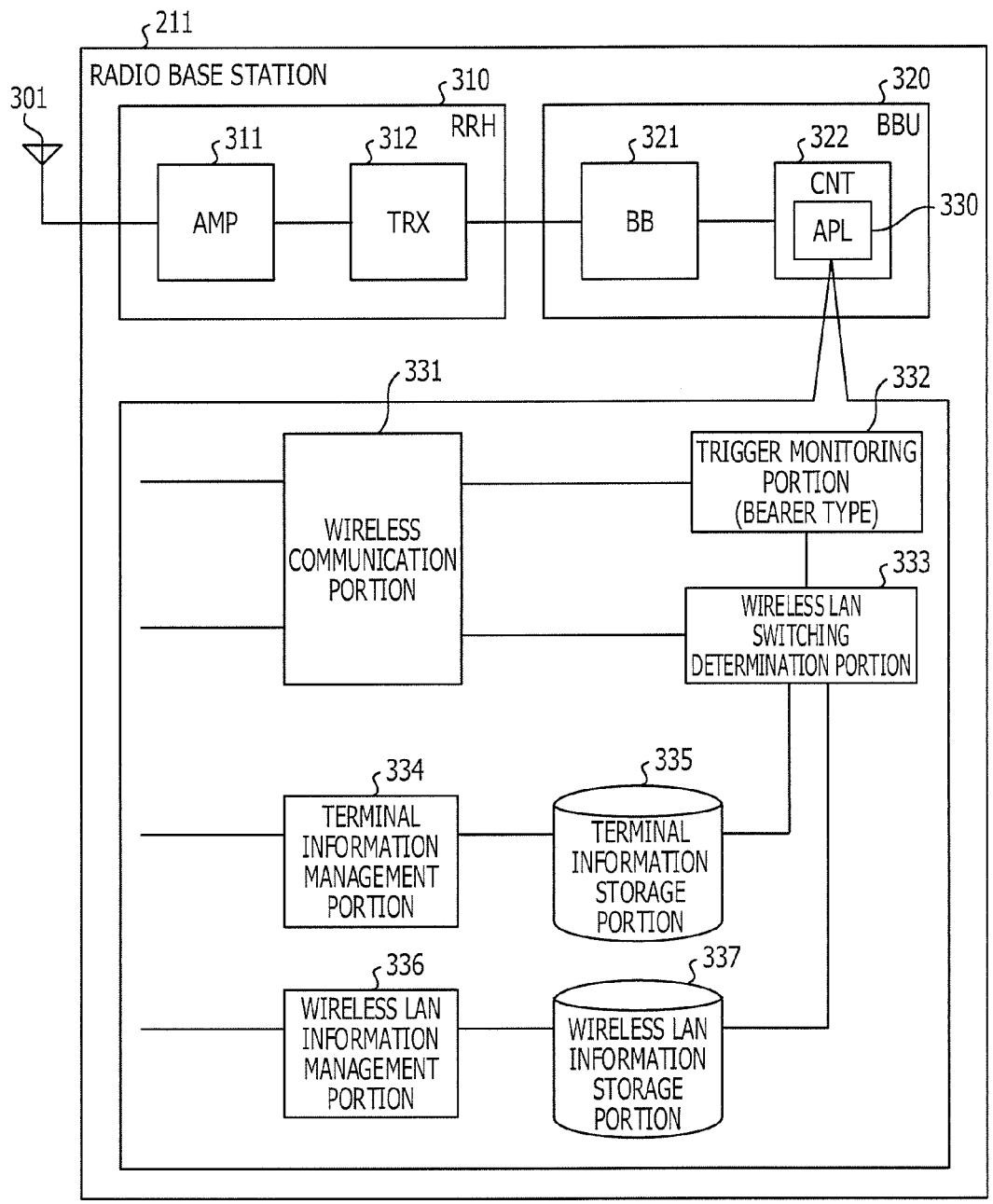
FIG. 3A is a diagram illustrating an example of a radio base station according to Embodiment 2.
Figure 3B:
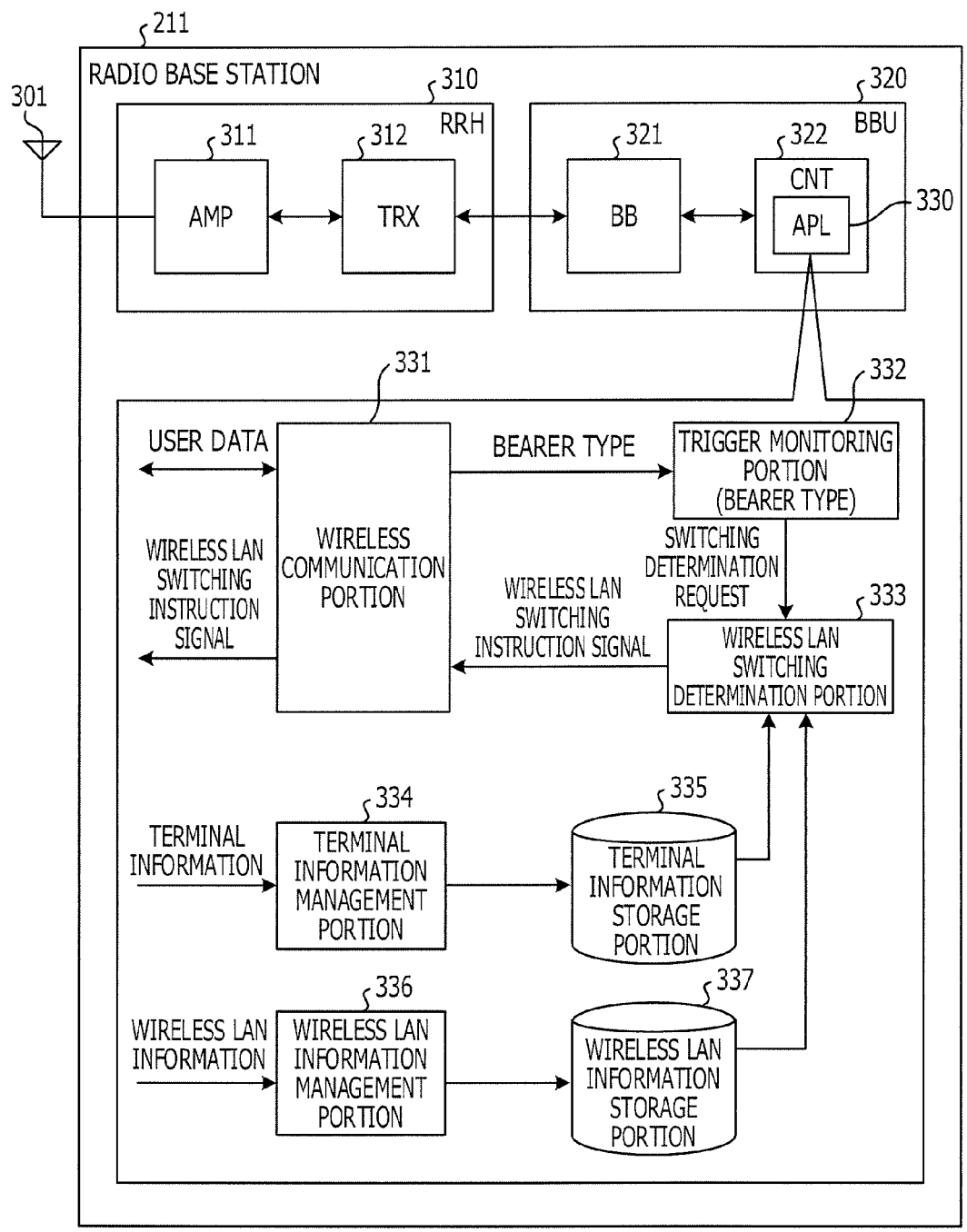
FIG. 3B is a diagram illustrating an example of a flow of information in the radio base station illustrated in FIG. 3A.

FIG. 3A is a diagram illustrating an example of the radio base station according to Embodiment 2. FIG. 3B is a diagram illustrating an example of a flow of information in the radio base station illustrated in FIG. 3A. As illustrated in FIGS. 3A and 3B, the radio base station 211 according to Embodiment 2 includes, for example, an antenna 301, a remote radio head (RRH) 310, and a base band unit (BBU) 320.

The RRH 310 transmits and receives a wireless signal to and from other communication devices (for example, the mobile terminal 240) by using the antenna 301. For example, the RRH 310 includes an amplifier 311 (AMP) and a wireless signal processing portion 312 (TRX). The amplifier 311 includes an amplifier which amplifies power of a signal to be transmitted from the antenna 301, and an amplifier which amplifies power of a signal received by the antenna 301.

The wireless signal processing portion 312 performs a wireless signal process on a wireless signal which is transmitted and received by the RRH 310. The wireless signal process performed by the wireless signal processing portion 312 includes conversion (D/A conversion) of a transmission signal to be transmitted from the antenna 301 from a digital signal to an analog signal, and conversion (A/D conversion) of a reception signal which is received by the antenna 301 from an analog signal to a digital signal.

The BBU 320 performs base band processes such as an S1/X2 line termination process, a digital base band signal process, a call process, and a monitoring control process. For example, the BBU 320 includes a base band processing section 321 (BB), and a controller 322 (CNT). The base band processing section 321 performs, for example, radio link control (RLC), Packet Data Convergence Protocol (PDCP), media access control (MAC), and a protocol process of each layer of physical layers (PHY).

The controller 322 performs control processes such as an Internet Protocol (IP) process, a call control process, an operation administration maintenance (OAM) process, an S1/X2 line termination process, a network address translation (NAT) process, a band control process, and a device failure monitoring process. For example, the controller 322 includes an application processing section 330 (APL). The application processing section 330 performs a call control process, an OAM process, setting and operation processes of the radio base station 211, and the like.

In addition, the application processing section 330 includes a wireless communication portion 331, a trigger monitoring portion 332, a wireless LAN switching determination portion 333, a terminal information management portion 334, a terminal information storage portion 335, a wireless LAN information management portion 336, and a wireless LAN information storage portion 337.

The acquisition unit 111 illustrated in FIGS. 1A and 1B can be realized by, for example, the terminal information management portion 334, the terminal information storage portion 335, the wireless LAN information management portion 336, and the wireless LAN information storage portion 337. The control unit 112 illustrated in FIGS. 1A and 1B can be realized by, for example, the wireless communication portion 331, the trigger monitoring portion 332, and the wireless LAN switching determination portion 333.

The wireless communication portion 331 performs transmission and reception of a control signal and transmission and reception of user data with the mobile terminal 240 via the base band processing section 321 and the RRH 310. A control signal which is transmitted from the wireless communication portion 331 to the mobile terminal 240 includes a wireless LAN switching instruction signal for instruction of switching to a wireless LAN, output from the wireless LAN switching determination portion 333.

The trigger monitoring portion 332 monitors a switching trigger for switching a communication path of the mobile terminal 240 to a wireless LAN. In Embodiment 2, the trigger monitoring portion 332 monitors a bearer type of communication with the mobile terminal 240 performed by the wireless communication portion 331, and requests the wireless LAN switching determination portion 333 to determine switching when a predetermined bearer type is detected.

When there is the switching determination request from the trigger monitoring portion 332, the wireless LAN switching determination portion 333 determines switching of a communication path of the mobile terminal 240 to a wireless LAN. For example, the wireless LAN switching determination portion 333 determines whether or not to cause the mobile terminal 240 to switch its communication path to a wireless LAN based on each information piece stored in the terminal information storage portion 335 and the wireless LAN information storage portion 337.

In addition, the wireless LAN switching determination portion 333 selects a wireless LAN which is a switching destination in a case of causing the mobile terminal 240 to switch its communication path to a wireless LAN. In addition, the wireless LAN switching determination portion 333 output, to the wireless communication portion 331, a wireless LAN switching instruction signal for instruction of switching to the selected wireless LAN. Accordingly, the wireless LAN switching instruction signal is transmitted from the wireless communication portion 331 to the mobile terminal 240, and thus the mobile terminal 240 switches its communication path to the wireless LAN.

The terminal information management portion 334 receives terminal information regarding the mobile terminal 240 from the mobile terminal 240. The terminal information includes terminal position information (for example, refer to FIG. 14) indicating a position of the mobile terminal 240, and movement speed information (refer to FIG. 18) indicating a movement speed of the mobile terminal 240.

Figure 13:
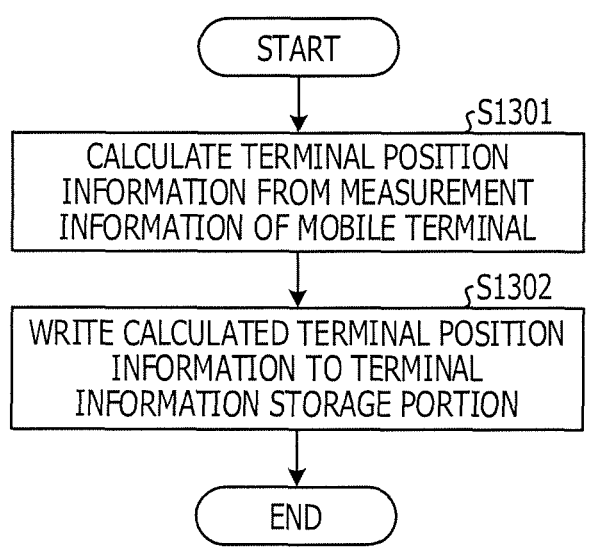
FIG. 13 is a flowchart illustrating an example of an acquisition process of terminal position information.

Alternatively, the terminal information management portion 334 may receive, from the mobile terminal 240, measurement information indicating a measurement result of electric waves which are sent to the mobile terminal 240 from the wireless LAN management server 221, and may calculate terminal position information indicating a position of the mobile terminal 240 from the received measurement information (for example, refer to FIG. 13). In this case, the measurement information may be, for example, physical cell identity (PCI) or reference signal received power (RSRP).

In addition, the terminal information may include connectable wireless LAN information (for example, refer to FIG. 16) indicating wireless LANs to which the mobile terminal 240 can be connected. The connectable wireless LAN information (for example, refer to FIG. 12B) is, for example, a service set identifier (SSID) of a wireless LAN. The terminal information management portion 334 outputs the acquired terminal information to the terminal information storage portion 335.

The terminal information storage portion 335 stores the terminal information output from the terminal information management portion 334. In addition, the terminal information storage portion 335 may store, for example, the connectable wireless LAN information or the like, in advance.

The wireless LAN information management portion 336 receives wireless LAN information regarding wireless LANs (for example, the access points 231 to 233) which are connection destination candidates of the mobile terminal 240 from the management server 212 or the wireless LAN management servers 221 and 222. The wireless LAN information includes, for example, wireless LAN congestion information (refer to FIG. 22) indicating congestion circumstances of communication of a wireless LAN which is a connection destination candidate of the mobile terminal 240.

In addition, the wireless LAN information may include wireless LAN position information (refer to FIG. 20) indicating a position of a wireless LAN which is a connection destination candidate of the mobile terminal 240. Further, the wireless LAN information may include wireless LAN transmission distance information indicating a wireless transmission distance of a wireless LAN which is a connection destination candidate of the mobile terminal 240. The wireless LAN information management portion 336 outputs the acquired wireless LAN information to the wireless LAN information storage portion 337.

The wireless LAN information storage portion 337 stores the wireless LAN information output from the wireless LAN information management portion 336. In addition, the wireless LAN information storage portion 337 may store, for example, wireless LAN position information or the like in advance. Further, the wireless LAN information storage portion 337 may store, for example, wireless LAN transmission distance information or the like in advance.

Hardware Configuration of Radio Base Station

Figure 3C:
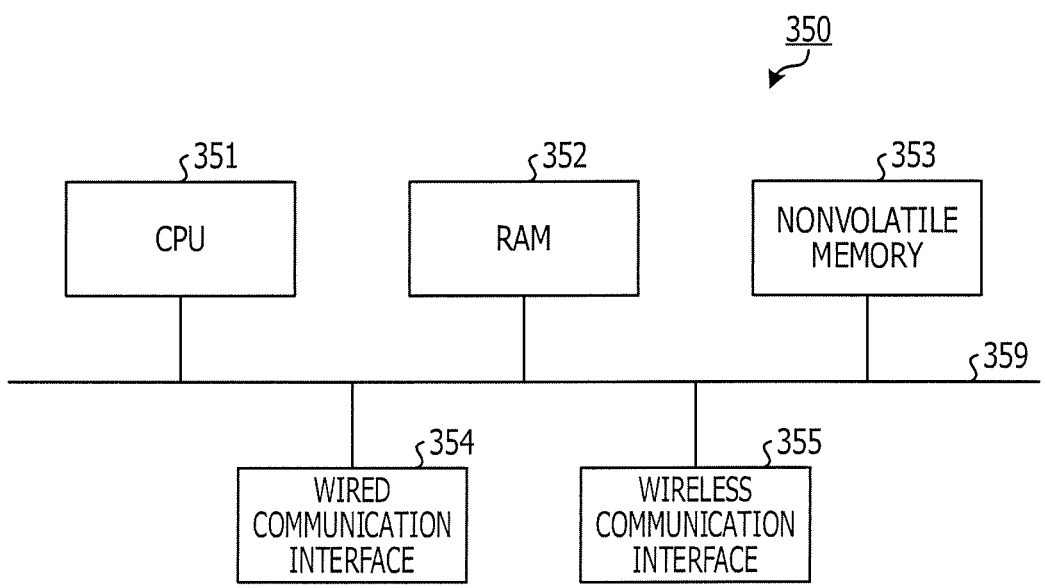
FIG. 3C is a diagram illustrating an example of a hardware configuration of the radio base station.

FIG. 3C is a diagram illustrating an example of a hardware configuration of the radio base station. The radio base station 211 illustrated in FIGS. 3A and 3B can be realized by, for example, a communication device 350 illustrated in FIG. 3C. The communication device 350 includes a central processing unit (CPU) 351, a random access memory (RAM) 352, and a nonvolatile memory 353. In addition, the communication device 350 includes a wired communication interface 354 and a wireless communication interface 355. The CPU 351, the RAM 352, the nonvolatile memory 353, the wired communication interface 354, and the wireless communication interface 355 are connected to each other via a bus 359.

The CPU 351 controls the entire communication device 350. The RAM 352 is used as a work area of the CPU 351.

The nonvolatile memory 353 is, for example, a nonvolatile memory such as a magnetic disk, an optical disc, or a flash memory. The nonvolatile memory 353 stores various programs for operating the communication device 350. The programs stored in the nonvolatile memory 353 are loaded to the RAM 352 and are executed by the CPU 351.

The wired communication interface 354 is a communication interface which performs communication with an external device (for example, the management server 212 or the wireless LAN management servers 221 and 222) of the communication device 350 in a wired manner. The wired communication interface 354 is controlled by the CPU 351.

The wireless communication interface 355 is a communication interface which performs communication with an external device (for example, the mobile terminal 240) of the communication device 350 in a wireless manner. The wireless communication interface 355 is controlled by the CPU 351. For example, the wireless communication interface 355 includes the antenna 301 or the RRH 310 illustrated in FIGS. 3A and 3B.

The BBU 320 illustrated in FIGS. 3A and 3B can be realized by, for example, the CPU 351 and the RAM 352. In addition, the terminal information management portion 334 illustrated in FIGS. 3A and 3B may receive terminal information by performing communication with the mobile terminal 240 via, for example, the wireless communication interface 355. Further, the wireless LAN information management portion 336 illustrated in FIGS. 3A and 3B may receive wireless LAN information by performing communication with the management server 212 or the wireless LAN management servers 221 and 222 via, for example, the wired communication interface 354.

Process in Communication System

FIG. 4 is a sequence diagram illustrating an example of a process in the communication system. In the communication system 200, for example, each step illustrated in FIG. 4 is performed. In the example illustrated in FIG. 4, the mobile terminal 240 is assumed to be currently connected to the radio base station 211. In addition, in the example illustrated in FIG. 4, a description will be made of a case where connection destination candidates of the mobile terminal 240 are the access points 231 and 232.

First, the radio base station 211 receives terminal information including terminal position information, movement speed information, and the like, from the mobile terminal 240 (step S401). The terminal information received in step S401 is stored in the terminal information storage portion 335 of the radio base station 211.

In addition, the wireless LAN management server 221 receives wireless LAN information including wireless LAN congestion information indicating congestion circumstances of communication of the access point 231, from the access point 231 (step S402). Further, the wireless LAN management server 221 receives wireless LAN information including wireless LAN congestion information indicating congestion circumstances of communication of the access point 232, from the access point 232 (step S403). The wireless LAN information may include wireless LAN position information indicating positions of the access points 231 and 232.

In addition, the radio base station 211 receives each wireless LAN information piece received by the wireless LAN management server 221 in steps S402 and S403, from the wireless LAN management server 221 (step S404). Each wireless LAN information piece received in step S404 is stored in the wireless LAN information storage portion 337 of the radio base station 211. Each of steps S401 to S404 may be performed periodically.

Next, it is assumed that the mobile terminal 240 sends a communication request to the radio base station 211 (step S405). In addition, it is assumed that a bearer type of the communication request in step S405 is a predetermined bearer type which is a switching target to a wireless LAN.

Next, the radio base station 211 selects a wireless LAN which is a connection destination of wireless LANs of the access points 231 and 232 based on the respective information pieces stored in the terminal information storage portion 335 and the wireless LAN information storage portion 337 (step S406). For example, the radio base station 211 selects a wireless LAN which can be connected to the mobile terminal 240 and is not in a congestion state based on the terminal information and the wireless LAN information. In the example illustrated in FIG. 4, in step S406, the wireless LAN of the access point 232 is assumed to be selected.

Next, the radio base station 211 transmits a wireless LAN switching instruction signal for instruction of connection to the wireless LAN of the access point 232, to the mobile terminal 240 (step S407). Next, the mobile terminal 240 makes a request for connection to the access point 232 (step S408). Accordingly, a communication path of the mobile terminal 240 is switched from the radio base station 211 to the access point 232, and the mobile terminal 240 starts communication according to the communication request in step S405, via the wireless LAN of the access point 232.

Monitoring Process of Bearer Type

Figure 5:
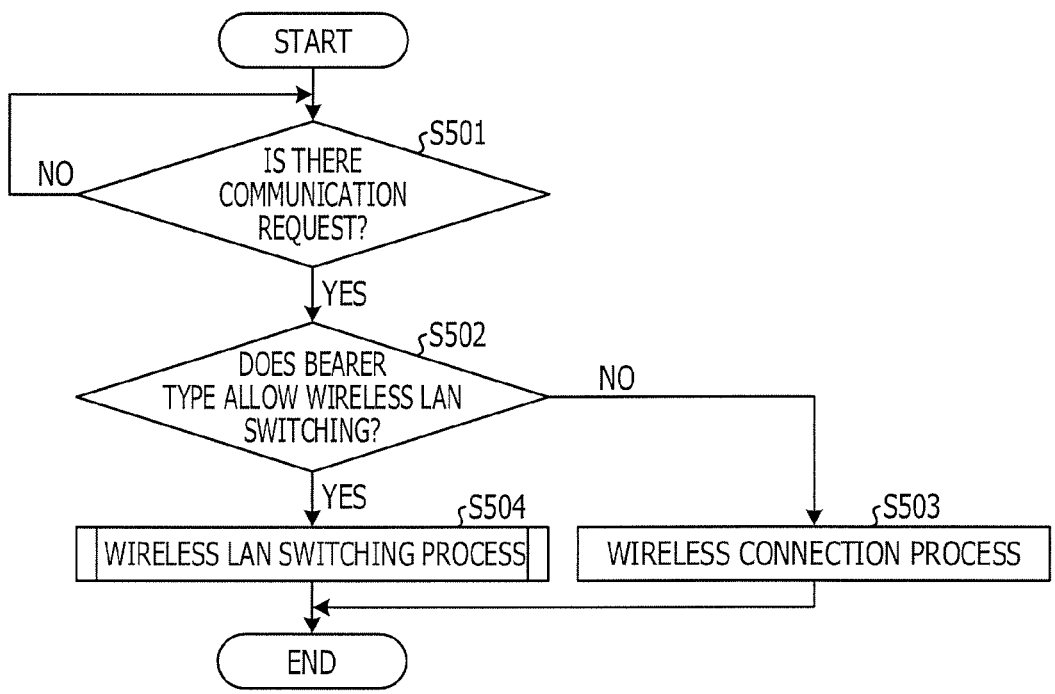
FIG. 5 is a flowchart illustrating an example of a monitoring process of a bearer type.

FIG. 5 is a flowchart illustrating an example of a monitoring process of a bearer type. The radio base station 211 repeatedly performs, for example, each step illustrated in FIG. 5. First, the radio base station 211 determines whether or not a communication request is sent from the mobile terminal 240 to the radio base station 211 (step S501), and waits for a communication request being sent (step S501: a loop of No). Step S501 is performed by, for example, the wireless communication portion 331.

If there is a communication request in step S501 (step S501: Yes), the radio base station 211 determines whether or not a bearer type of a call according to the communication request is a bearer type which allows wireless LAN switching to be performed (step S502). Step S502 is performed by, for example, the trigger monitoring portion 332. The determination of whether or not a bearer type is a bearer type which allows wireless LAN switching to be performed will be described later (for example, refer to FIG. 6).

In step S502, if the bearer type is not a bearer type which allows wireless LAN switching to be performed (step S502: No), the radio base station 211 performs a wireless connection process in response to the communication request (step S503). Step S503 is performed by, for example, the wireless communication portion 331. Accordingly, the mobile terminal 240 can perform communication via the radio base station 211. In addition, the radio base station 211 finishes a series of monitoring processes.

If the bearer type is a bearer type which allows wireless LAN switching to be performed in step S502 (step S502: Yes), the radio base station 211 performs a wireless LAN switching process (step S504), and finishes a series of monitoring processes. Step S504 is performed by, for example, the wireless LAN switching determination portion 333. The wireless LAN switching process is a process in which, when there is an appropriate wireless LAN around the mobile terminal 240, a communication path of the mobile terminal 240 is switched to the wireless LAN. The wireless LAN switching process will be described later (for example, refer to FIG. 7).

Due to the respective steps, the wireless LAN switching process can be performed with the communication request from the mobile terminal 240 as a trigger. In addition, in a case where a bearer type of a call according to a communication request is a bearer type in which switching to a wireless LAN is not recommended, a wireless LAN switching process of the mobile terminal 240 is not made to be performed.

Setting of Propriety of Wireless LAN Switching

FIG. 6 is a diagram illustrating an example of setting of the propriety of wireless LAN switching. For example, the radio base station 211 stores a table 600 illustrated in FIG. 6 in a memory (for example, the nonvolatile memory 353). The table 600 includes items "QCI", "Resource Ttype", "Priority", "Packet Delay Budget", "Packet Error Loss Rate", and "Example Services". The respective items are defined in, for example, Table 6.1.7: Standardized QCI characteristics which is prescribed in TS23.203 V8.3.1 of 3GPP. In addition, the table 600 further includes an item "propriety of wireless LAN switching".

The "QCI" is a quality of service (QoS) class ID, and a bearer type of a call according to a communication request can be determined from "QCI". The "propriety of wireless LAN switching" is information indicating the propriety of wireless LAN switching for each "QCI". A manager of the radio base station 211 may set the "propriety of wireless LAN switching" of the table 600 based on various communication policies so as to set the propriety of wireless LAN switching for each bearer type.

For example, the trigger monitoring portion 332 determines the "propriety of wireless LAN switching" corresponding to a "QCI" according to a communication request based on the table 600 in step S502 of FIG. 5. Accordingly, it is possible to determine whether or not a bearer type of a call according to the communication request is a bearer type which allows wireless signal to be performed.

Wireless LAN Switching Process

Figure 7:
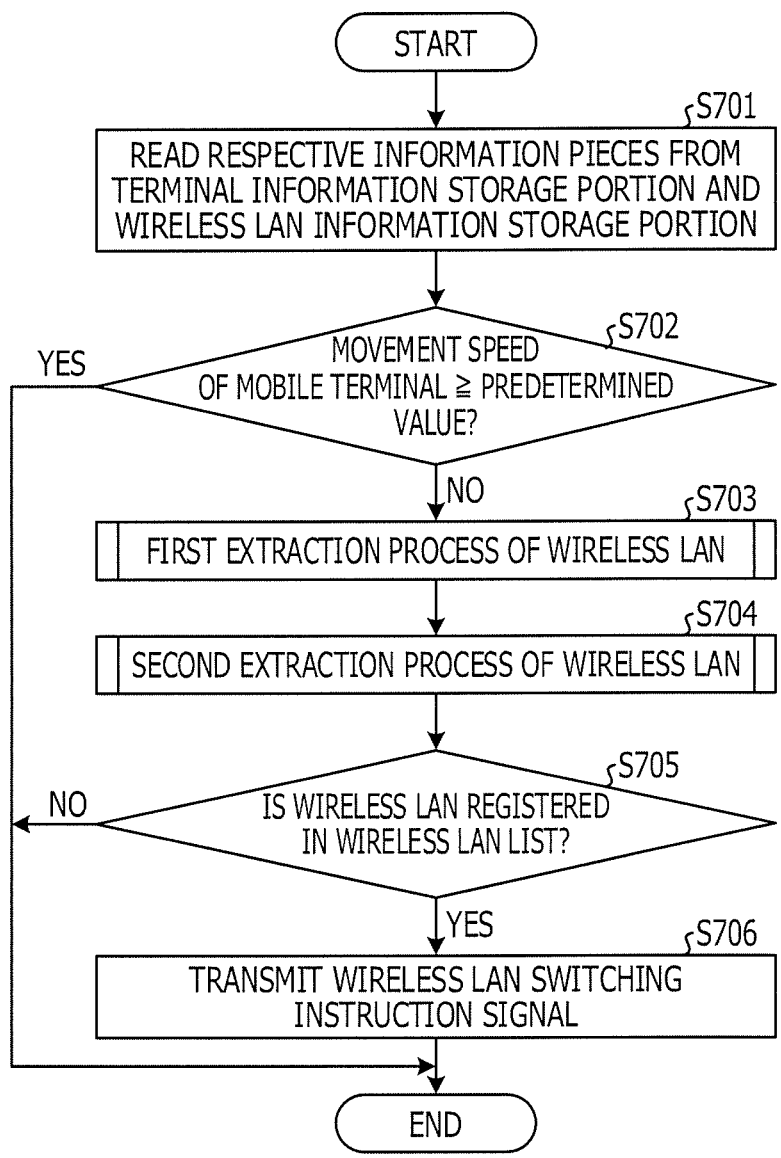
FIG. 7 is a flowchart illustrating an example of a wireless LAN switching process.

FIG. 7 is a flowchart illustrating an example of a wireless LAN switching process. The wireless LAN switching determination portion 333 performs the following respective steps as the wireless LAN switching process in step S504. First, the wireless LAN switching determination portion 333 reads respective information pieces including the terminal information and the wireless LAN information from the terminal information storage portion 335 and the wireless LAN information storage portion 337 (step S701).

Next, the wireless LAN switching determination portion 333 determines whether or not a movement speed of the mobile terminal 240 is equal to or higher than a predetermined value based on movement speed information included in the terminal information read in step S701 (step S702). The predetermined value may be set to, for example, a value corresponding to a human walking speed (for example, 6 [km/h]). If a movement speed is equal to or higher than the predetermined value (step S702: Yes), the wireless LAN switching determination portion 333 finishes a series of wireless LAN switching processes without performing wireless LAN switching control.

If a movement speed is lower than the predetermined value in step S702 (step S702: No), the wireless LAN switching determination portion 333 performs a first extraction process of a wireless LAN (step S703). The first extraction process of a wireless LAN is a process in which wireless LANs around the mobile terminal 240 which can be connected to the mobile terminal 240 are extracted, and a wireless LAN list as an extraction result is returned. The first extraction process of a wireless LAN will be described later (for example, refer to FIG. 8).

Next, the wireless LAN switching determination portion 333 performs a second extraction process of a wireless LAN (step S704). The second extraction process of a wireless LAN is a process in which wireless LANs which are not in a congestion state are extracted from the wireless LAN list obtained due to the first extraction process of a wireless LAN in step S703, and a wireless LAN list as an extraction result is returned. The second extraction process of a wireless LAN will be described later (for example, refer to FIG. 10).

Next, the wireless LAN switching determination portion 333 determines whether or not a wireless LAN is registered in the wireless LAN list obtained in step S704 (step S705). If a wireless LAN is not registered in the wireless LAN list (step S705: No), the wireless LAN switching determination portion 333 finishes a series of wireless LAN switching processes without performing wireless LAN switching control.

If a wireless LAN is registered in the wireless LAN list in step S705 (step S705: Yes), the wireless LAN switching determination portion 333 transmits a wireless LAN switching instruction signal to the mobile terminal 240 via the wireless communication portion 331 (step S706). The wireless LAN switching instruction signal is a signal for instruction of switching to a wireless LAN registered in the wireless LAN list obtained in step S704. In addition, the wireless LAN switching determination portion 333 finishes a series of wireless LAN switching processes.

Due to the above-described respective steps, if an appropriate wireless LAN is present around the mobile terminal 240, a communication path of the mobile terminal 240 can be switched to a wireless LAN. In addition, in a case where a movement speed of the mobile terminal 240 is high, a wireless LAN switching process of the mobile terminal 240 is not made to be performed.

First Extraction Process of Wireless LAN

Figure 8:
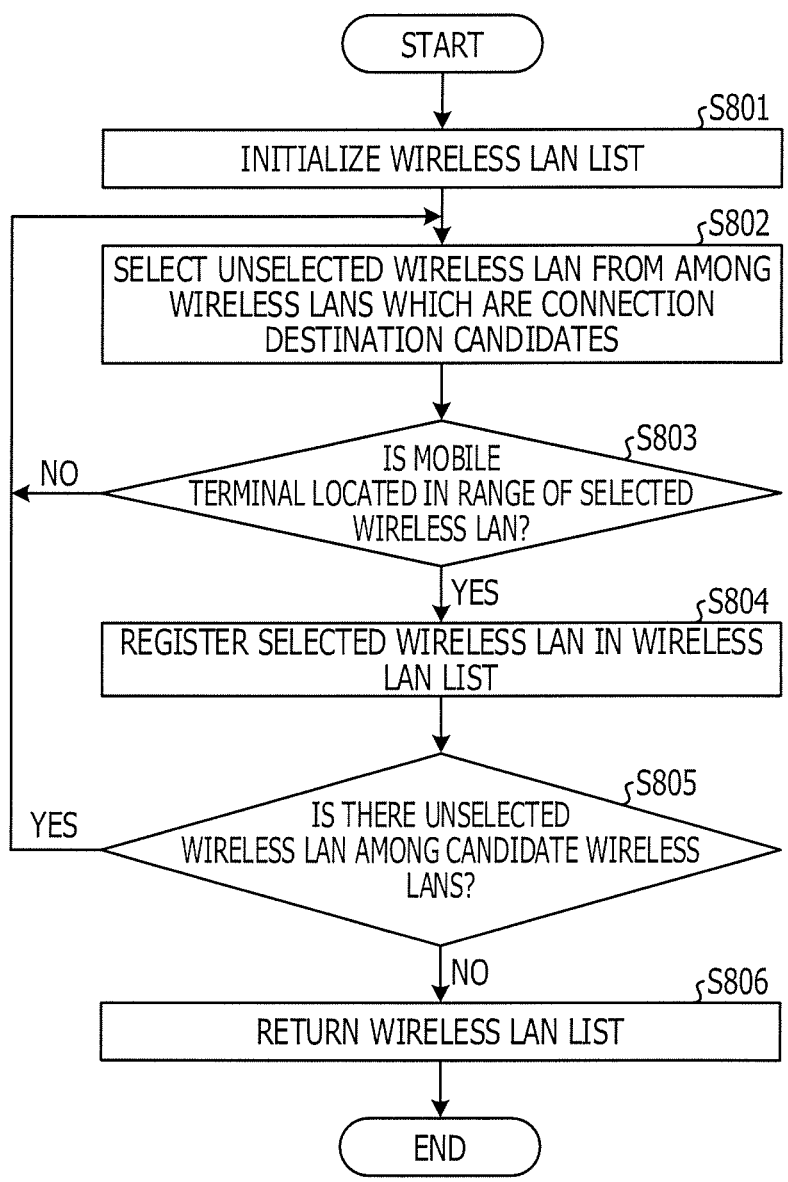
FIG. 8 is a flowchart illustrating an example of a first extraction process of a wireless LAN.

FIG. 8 is a flowchart illustrating an example of the first extraction process of a wireless LAN. The wireless LAN switching determination portion 333 performs, for example, the following respective steps illustrated in FIG. 8 as the first extraction process of a wireless LAN in step S703 illustrated in FIG. 7. First, the wireless LAN switching determination portion 333 initializes the wireless LAN list (step S801). For example, the wireless LAN switching determination portion 333 empties the wireless LAN list. The wireless LAN list is information stored in, for example, the RAM 352.

Next, the wireless LAN switching determination portion 333 selects an unselected wireless LAN in step S802, from among wireless LANs which are connection destination candidates of the mobile terminal 240 (step S802). The wireless LANs which are connection destination candidates of the mobile terminal 240 can be specified, for example, by the mobile terminal 240 or the like receiving connectable wireless LAN information (for example, refer to FIG. 12B) indicating wireless LANs which can be connected to the mobile terminal 240.

Next, the wireless LAN switching determination portion 333 determines whether or not the mobile terminal 240 is located in a communication range of the wireless LAN selected in step S802 (step S803). For example, the wireless LAN switching determination portion 333 may perform the determination in step S803 based on the terminal position information, the wireless LAN position information, and the wireless LAN transmission distance information included in the respective information pieces read in step S701 of FIG. 7.

If the mobile terminal 240 is not located in a communication range of the selected wireless LAN in step S803 (step S803: No), the wireless LAN switching determination portion 333 returns to step S802. If the mobile terminal 240 is located in a communication range of the selected wireless LAN (step S803: Yes), the wireless LAN switching determination portion 333 registers the wireless LAN selected in step S802 in the wireless LAN list (step S804).

Next, the wireless LAN switching determination portion 333 determines whether or not there is a wireless LAN which is not selected in step S802 among the wireless LANs which are connection destination candidates of the mobile terminal 240 (step S805). If there is an unselected wireless LAN (step S805: Yes), the wireless LAN switching determination portion 333 returns to step S802. If there is no unselected wireless LAN (step S805: No), the wireless LAN switching determination portion 333 returns the wireless LAN list as a result of the first extraction process (step S806).

Due to the above-described respective steps, it is possible to obtain a wireless LAN list which registers therein a wireless LAN of which the mobile terminal 240 is located in a communication range among wireless LANs which are connection destination candidate of the mobile terminal 240.

Extraction Result of First Extraction Process of Wireless LAN

Figure 9:
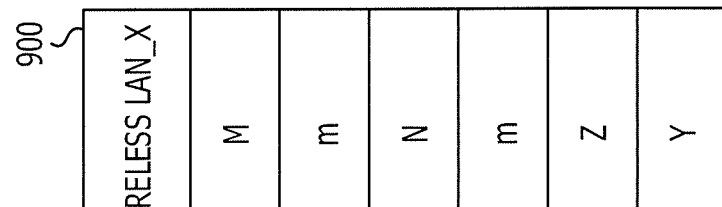
FIG. 9 is a diagram illustrating an example of an extraction result due to the first extraction process of a wireless LAN.

FIG. 9 is a diagram illustrating an example of an extraction result of the first extraction process of a wireless LAN. The wireless LAN switching determination portion 333 can obtain, for example, a wireless LAN list 900 illustrated in FIG. 9 due to the first extraction process of a wireless LAN illustrated in FIG. 8.

The wireless LAN list 900 includes items "wireless LAN name", "maximal number of terminals", "current number of terminals", "maximal corresponding to rate [Mbps]", "current communication rate [Mbps]", "maximal transmission distance [m]", and "current terminal position [m]".

The "wireless LAN name" is the name of a wireless LAN. In the wireless LAN list 900, wireless LANs having "wireless LAN_A", "wireless LAN_B", "wireless LAN_G", . . . , and "wireless LAN_X" as the "wireless LAN name" are registered. For example, the wireless LANs having the "wireless LAN_A", the "wireless LAN_B", and the "wireless LAN_G" as the "wireless LAN name" are wireless LANs which respectively correspond to 802.11a, 802.11b, and 802.11g of the Institute of Electrical and Electronics Engineers (IEEE).

The "maximal number of terminals" is a maximal number of mobile terminals which can be simultaneously connected to a wireless LAN. The "current number of terminals" is the number of mobile terminals which are currently connected to a wireless LAN. The "maximal communication rate [Mbps]" is a maximal value of a sum of communication rates (communication bands) of wireless communication performed by a wireless LAN. The "current communication rate [Mbps]" is a sum of communication rates of wireless communication which is currently performed by a wireless LAN. The "maximal transmission distance [m]" is a distance at which a wireless LAN can perform wireless communication.

The "current terminal position [m]" is a current position of the mobile terminal 240. In the example illustrated in FIG. 9, the "current terminal position [m]" is indicated by a distance between a current position of the mobile terminal 240 and a position of a wireless LAN.

Second Extraction Process of Wireless LAN

Figure 10:
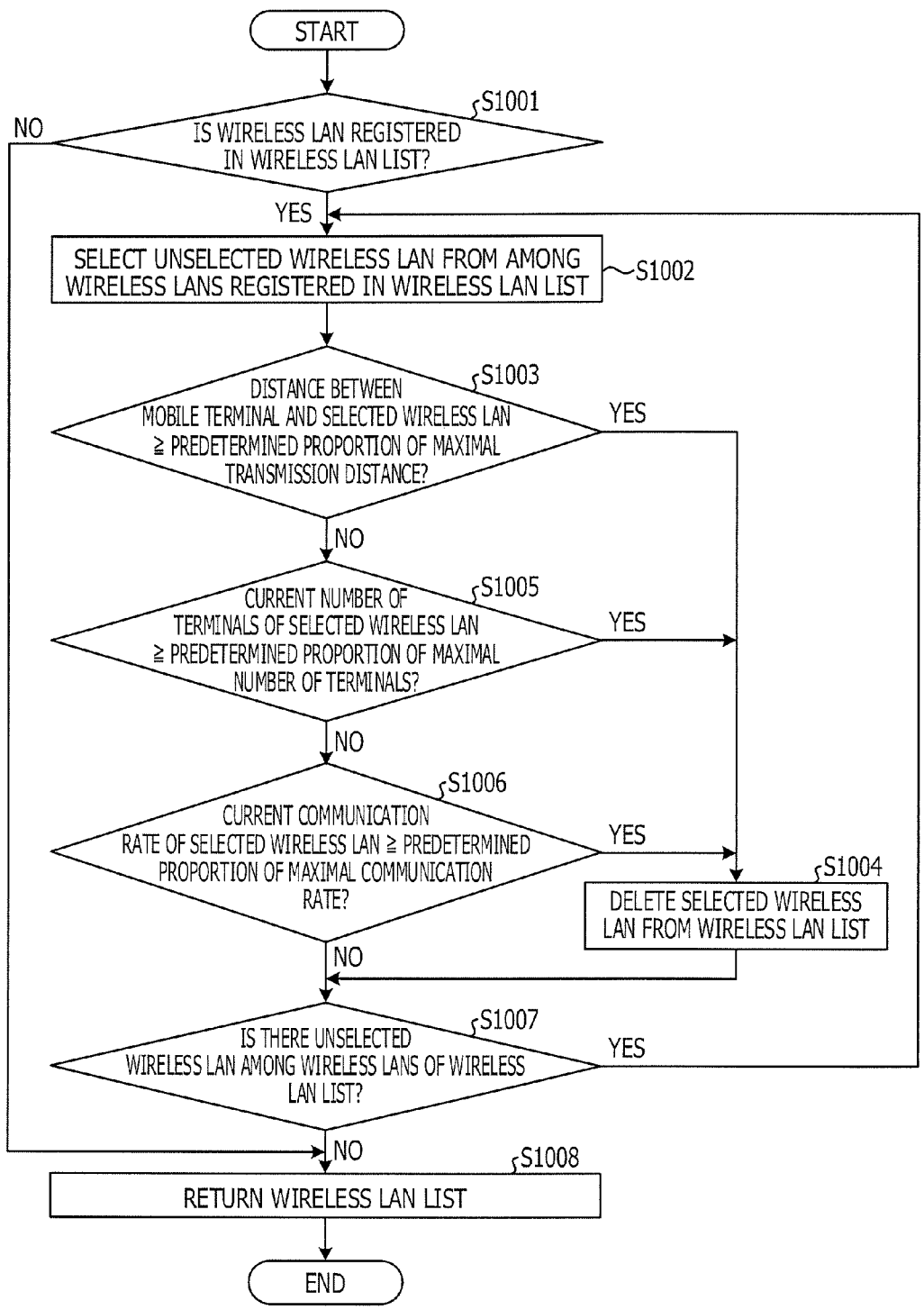
FIG. 10 is a flowchart illustrating an example of a second extraction process of a wireless LAN.

FIG. 10 is a flowchart illustrating an example of the second extraction process of a wireless LAN. The wireless LAN switching determination portion 333 performs, for example, each step illustrated in FIG. 10 as the second extraction process of a wireless LAN in step S704 illustrated in FIG. 7. First, the wireless LAN switching determination portion 333 determines whether or not a wireless LAN is registered in the wireless LAN list obtained due to the first extraction process of a wireless LAN in step S703 (step S1001). If a wireless LAN is not registered in the wireless LAN list (step S1001: No), the wireless LAN switching determination portion 333 proceeds to step S1008.

If a wireless LAN is registered in the wireless LAN list in step S1001 (step S1001: Yes), the wireless LAN switching determination portion 333 proceeds to step S1002. In other words, the wireless LAN switching determination portion 333 selects a wireless LAN which is not selected in step S1002 from among wireless LANs registered in the wireless LAN list (step S1002).

Next, the wireless LAN switching determination portion 333 determines whether or not a distance between the mobile terminal 240 and the wireless LAN selected in step S1002 is equal to or higher than a predetermined proportion of a maximal transmission distance of the wireless LAN selected in step S1002 (step S1003). For example, the wireless LAN switching determination portion 333 may perform the determination in step S1003 based on the terminal position information, the wireless LAN position information, and the wireless LAN transmission distance information included in the respective information pieces read in step S701 of FIG. 7. The predetermined proportion may be 80% as an example.

If the distance is equal to or higher than the predetermined proportion of the maximal transmission distance in step S1003 (step S1003: Yes), the wireless LAN switching determination portion 333 deletes the wireless LAN selected in step S1002 from the wireless LAN list (step S1004). In addition, the wireless LAN switching determination portion 333 proceeds to step S1007.

If the distance is lower than the predetermined proportion of the maximal transmission distance in step S1003 (step S1003: No), the wireless LAN switching determination portion 333 proceeds to step S1005. In other words, the wireless LAN switching determination portion 333 determines whether or not a current number of terminals of the wireless LAN selected in step S1002 is equal to or higher than a predetermined proportion of a maximal number of terminals of the wireless LAN selected in step S1002 (step S1005). For example, the wireless LAN switching determination portion 333 may perform the determination in step S1005 based on the wireless LAN congestion information included in the respective information pieces read in step S701 of FIG. 7. The predetermined proportion may be 80% as an example.

If the current number of terminals is equal to or higher than the predetermined proportion of the maximal number of terminals in step S1005 (step S1005: Yes), the wireless LAN switching determination portion 333 proceeds to step S1004. If the current number of terminals is lower than the predetermined proportion of the maximal number of terminals (step S1005: No), the wireless LAN switching determination portion 333 proceeds to step S1006.

In other words, the wireless LAN switching determination portion 333 determines whether or not a current communication rate of the wireless LAN selected in step S1002 is equal to or higher than a predetermined proportion of a maximal communication rate of the wireless LAN selected in step S1002 (step S1006). For example, the wireless LAN switching determination portion 333 may perform the determination in step S1006 based on the wireless LAN congestion information included in the respective information pieces read in step S701 of FIG. 7. The predetermined proportion may be 80% as an example. If the current communication rate is equal to or higher than the predetermined proportion of the maximal communication rate (step S1006: Yes), the wireless LAN switching determination portion 333 proceeds to step S1004.

If the current communication rate is lower than the predetermined proportion of the maximal communication rate in step S1006 (step S1006: No), the wireless LAN switching determination portion 333 proceeds to step S1007. In other words, the wireless LAN switching determination portion 333 determines whether or not there is a wireless LAN which is not selected in step S1002 among the wireless LANs of the wireless LAN list (step S1007).

If there is an unselected wireless LAN in step S1007 (step S1007: Yes), the wireless LAN switching determination portion 333 returns to step S1002. If there is no unselected wireless LAN (step S1007: No), the wireless LAN switching determination portion 333 returns the wireless LAN list as a result of the second extraction process (step S1008).

Due to the above-described respective steps, among the wireless LANs extracted due to the first extraction process of a wireless LAN, it is possible to obtain the wireless LAN list which registers therein a wireless LAN which is close to the mobile terminal 240, has a small current number of terminals, and has a low communication rate. In addition, for example, step S1003 may be omitted in the above-described process. Further, for example, either step S1005 or S1006 may be omitted in the above-described process. Also in this case, it is possible to obtain a wireless LAN list which registers therein a wireless LAN which is in a less congestion state.

Extraction Result of Second Extraction Process of Wireless LAN

FIG. 11 is a diagram illustrating an example of an extraction result of the second extraction process of a wireless LAN. The wireless LAN switching determination portion 333 extracts, for example, a wireless LAN having "wireless LANG" as the "wireless LAN name" as indicated by an extraction result 1110 of FIG. 11 due to the second extraction process of a wireless LAN illustrated in FIG. 10.

For example, in the wireless LAN list 900, the wireless LAN having the "wireless LAN_A" as the "wireless LAN name" is deleted due to steps S1003 and S1004 of FIG. 10 since the "current terminal position" is 40 [m] as indicated by the reference numeral 1121.

In addition, in the wireless LAN list 900, the wireless LAN having the "wireless LAN_B" as the "wireless LAN name" is deleted due to steps S1005 and S1004 of FIG. 10 since the "current number of terminals" is 46 as indicated by the reference numeral 1122.

Format of Wireless LAN Switching Instruction Signal

FIG. 12A is a diagram illustrating an example of a format of the wireless LAN switching instruction signal. The radio base station 211 transmits, for example, a wireless LAN switching instruction signal 1210 illustrated in FIG. 12A. The wireless LAN switching instruction signal 1210 includes items "Message Type" and "SSID Information".

For example, the radio base station 211 stores an SSID of the wireless LAN registered in the wireless LAN list obtained due to the second extraction process of a wireless LAN in step S704 illustrated in FIG. 7, in the "SSID Information". In addition, the wireless LAN switching instruction signal 1210 is not a new signal but may be added as an information element of an existing message.

Connectable Wireless LAN Information

FIG. 12B is a diagram illustrating an example of connectable wireless LAN information. The wireless LAN which is a connection destination candidate of the mobile terminal 240 in the process of FIG. 8 may be, for example, a wireless LAN indicated by connectable wireless LAN information 1220 illustrated in FIG. 12B. The connectable wireless LAN information 1220 includes items "SSID Information" and ">SSID". The "SSID Information" indicates an SSID of a wireless LAN which is a connection destination candidate of the mobile terminal 240.

Alternatively, wireless LANs which are connection destination candidates of the mobile terminal 240 in the process of FIG. 8 may be all wireless LANs which are managed by the radio base station 211. In this case, the radio base station 211 designates a wireless LAN which is included in the wireless LAN list obtained due to the second extraction process of step S704 illustrated in FIG. 7 and is included in the connectable wireless LAN information 1220, as a connection destination of the mobile terminal 240.

Alternatively, the connectable wireless LAN information 1220 may be information indicating a wireless LAN which can be connected to all mobile terminals. In this case, wireless LANs which are connection destination candidates of the mobile terminal 240 in the process of FIG. 8 may be, for example, all wireless LANs indicated by the connectable wireless LAN information 1220.

Acquisition Process of Terminal Position Information

FIG. 13 is a flowchart illustrating an example of an acquisition process of terminal position information. The terminal information management portion 334 performs each step illustrated in FIG. 13, for example, periodically (for example, every minute). First, the terminal information management portion 334 receives, from the mobile terminal 240, measurement information indicating a measurement result of electric waves which are sent to the mobile terminal 240 from the wireless LAN management server 221. In addition, the terminal information management portion 334 calculates terminal position information indicating a position of the mobile terminal 240 from the received measurement information of the mobile terminal 240 (step S1301).

Next, the terminal information management portion 334 writes the terminal position information calculated in step S1301 to the terminal information storage portion 335 (step S1302). In addition, the terminal information management portion 334 finishes a series of terminal position information acquisition processes.

Alternatively, the mobile terminal 240 may transmit terminal position information indicating a position of the mobile terminal 240 which is measured by using a GPS or the like, to the radio base station 211. In this case, the terminal information management portion 334 writes the terminal position information acquired from the mobile terminal 240, to the terminal information storage portion 335.

Terminal Position Information Table

FIG. 14 is a diagram illustrating an example of a terminal position information table. The terminal information storage portion 335 stores, for example, a terminal position information table 1400 illustrated in FIG. 14. The terminal position information table 1400 is a table including terminal position information of each mobile terminal.

The terminal position information table 1400 includes items "terminal name" and "current terminal position". The "terminal name" is the name of a mobile terminal (for example, the mobile terminal 240). The "current terminal position" indicates a current position of a mobile terminal. In the example illustrated in FIG. 14, the "current terminal position" is indicated by longitude and latitude. Alternatively, the "current terminal position" may be indicated by, for example, a distance from the radio base station 211.

Acquisition Process of Connectable Wireless LAN Information

Figure 15:
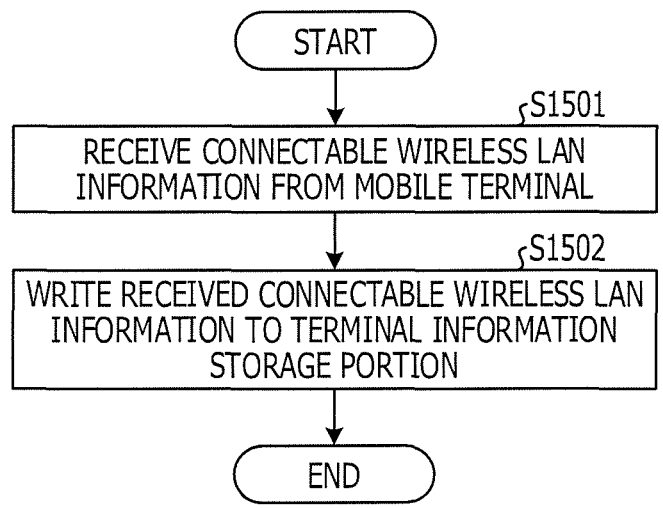
FIG. 15 is a flowchart illustrating an example of an acquisition process of connectable wireless LAN information.

FIG. 15 is a flowchart illustrating an example of an acquisition process of connectable wireless LAN information. The terminal information management portion 334 performs each step illustrated in FIG. 15, for example, periodically (for example, every day). First, the terminal information management portion 334 receives connectable wireless LAN information indicating a wireless LAN which was connected to the mobile terminal 240 in the past, from the mobile terminal 240 (step S1501).

Next, the terminal information management portion 334 writes the connectable wireless LAN information received in step S1501 to the terminal information storage portion 335 (step S1502). In addition, the terminal information management portion 334 finishes a series of connectable wireless LAN information acquisition process.

Connectable Wireless LAN Information Table

FIG. 16 is a diagram illustrating an example of a connectable wireless LAN information table. The terminal information storage portion 335 stores, for example, a connectable wireless LAN information table 1600 illustrated in FIG. 16. The connectable wireless LAN information table 1600 is a table including connectable wireless LAN information of each mobile terminal.

The connectable wireless LAN information table 1600 includes items "terminal name" and "wireless LAN information". The "terminal name" is the name of a mobile terminal (for example, the mobile terminal 240). The "wireless LAN information" is an SSID of a wireless LAN which was connected to a mobile terminal in the past.

Acquisition Process of Movement Speed Information

Figure 17:
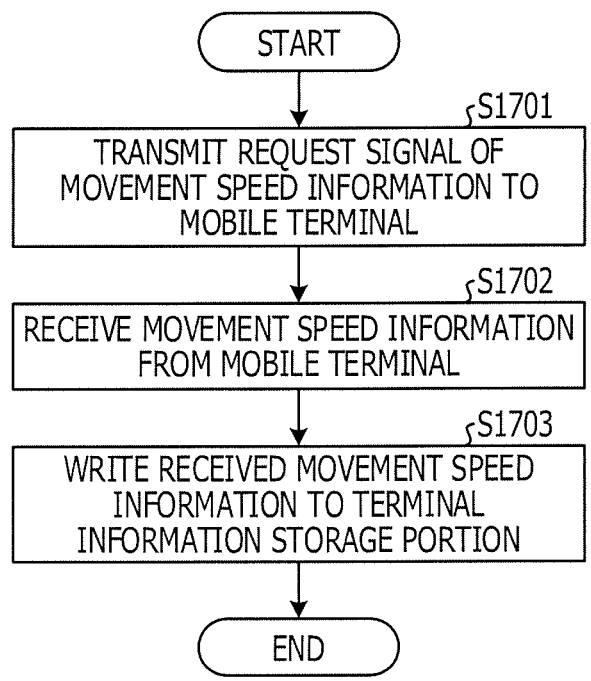
FIG. 17 is a flowchart illustrating an example of an acquisition process of movement speed information.

FIG. 17 is a flowchart illustrating an example of an acquisition process of movement speed information. The terminal information management portion 334 performs each step illustrated in FIG. 17, for example, periodically (for example, every minute or every three minutes). First, the terminal information management portion 334 transmits a request signal of movement speed information to the mobile terminal 240 (step S1701). In response thereto, the mobile terminal 240 transmits movement speed information indicating a movement speed of the mobile terminal 240 which is measured by using a GPS, an acceleration sensor, or the like.

In addition, the terminal information management portion 334 receives the movement speed information from the mobile terminal 240 (step S1702). Next, the terminal information management portion 334 writes the movement speed information received in step S1702 to the terminal information storage portion 335 (step S1703). In addition, the terminal information management portion 334 finishes a series of movement speed information acquisition processes.

Movement Speed Information Table

Figure 18:
FIG. 18 is a diagram illustrating an example of a movement speed information table.

FIG. 18 is a diagram illustrating an example of a movement speed information table. The terminal information storage portion 335 stores, for example, a movement speed information table 1800 illustrated in FIG. 18. The movement speed information table 1800 is a table including movement speed information of each mobile terminal. The movement speed information table 1800 includes items "terminal name" and "terminal movement speed [km/h]". The "terminal name" is the name of a mobile terminal (for example, the mobile terminal 240). The "terminal movement speed [km/h]" is a movement speed [km/h] of a mobile terminal.

Acquisition Process of Wireless LAN Position Information

Figure 19:
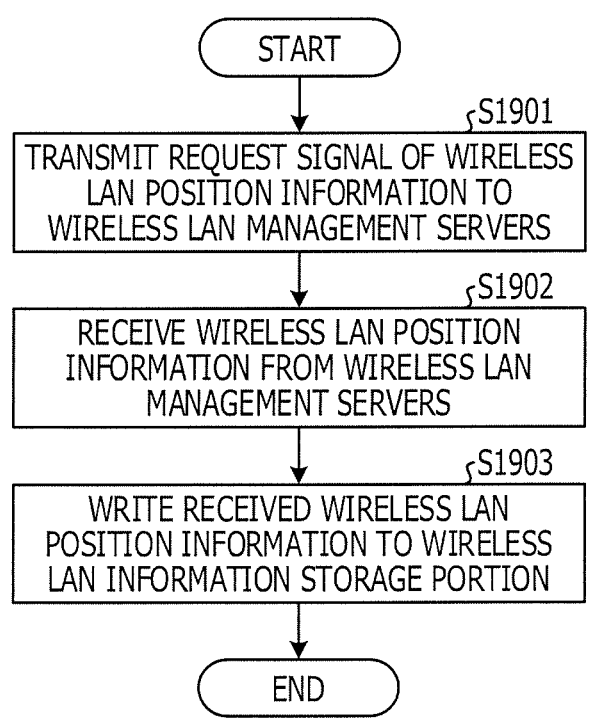
FIG. 19 is a flowchart illustrating an example of an acquisition process of wireless LAN position information.

FIG. 19 is a flowchart illustrating an example of an acquisition process of wireless LAN position information. The wireless LAN information management portion 336 performs each step illustrated in FIG. 19, for example, periodically (for example, every day or every hour). First, the wireless LAN information management portion 336 transmits a request signal of wireless LAN position information to the wireless LAN management servers 221 and 222 (step S1901). In response thereto, the wireless LAN management server 221 transmits wireless LAN position information indicating a position of each of the access points 231 and 232. In addition, the wireless LAN management server 222 transmits wireless LAN position information indicating a position of the access point 233.

The wireless LAN information management portion 336 receives the wireless LAN position information from the wireless LAN management servers 221 and 222 (step S1902). Next, the wireless LAN information management portion 336 writes the wireless LAN position information received in step S1902 to the wireless LAN information storage portion 337 (step S1903). In addition, the wireless LAN information management portion 336 finishes a series of wireless LAN position information acquisition processes.

Wireless LAN Position Information Table

Figure 20:
FIG. 20 is a diagram illustrating an example of a wireless LAN position information table.

FIG. 20 is a diagram illustrating an example of a wireless LAN position information table. The wireless LAN information storage portion 337 stores, for example, a wireless LAN position information table 2000 illustrated in FIG. 20. The wireless LAN position information table 2000 is a table including wireless LAN position information of each wireless LAN.

The wireless LAN position information table 2000 includes items "wireless LAN name" and "wireless LAN position". The "wireless LAN name" is the name of a wireless LAN (for example, wireless LANs of the access points 231 to 233). The "wireless LAN position" is a position of a wireless LAN. In the example illustrated in FIG. 20, the "wireless LAN position" is indicated by longitude and latitude. Alternatively, the "wireless LAN position" may be indicated by a distance from the radio base station 211.

Acquisition Process of Wireless LAN Congestion Information

Figure 21:
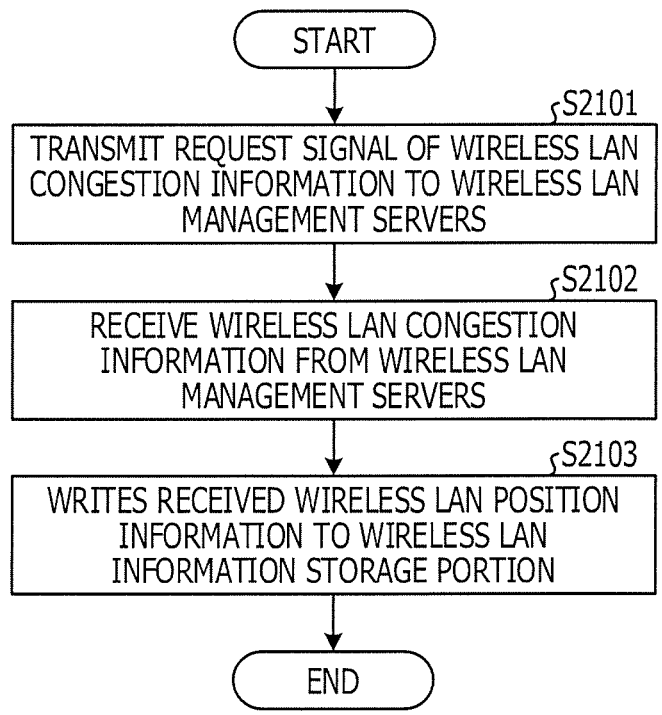
FIG. 21 is a flowchart illustrating an example of an acquisition process of wireless LAN congestion information.

FIG. 21 is a flowchart illustrating an example of an acquisition process of wireless LAN congestion information. The wireless LAN information management portion 336 performs each step illustrated in FIG. 21, for example, periodically (for example, every hour). First, the wireless LAN information management portion 336 transmits a request signal of wireless LAN congestion information to the wireless LAN management servers 221 and 222 (step S2101).

In response thereto, the wireless LAN management server 221 transmits wireless LAN congestion information indicating congestion circumstances of each of the access points 231 and 232. In addition, the wireless LAN management server 222 transmits wireless LAN congestion information indicating congestion circumstances of the access point 233. The wireless LAN congestion information includes, for example, a current communication rate, a maximal communication rate, a current number of terminals, a maximal number of terminals, and a maximal transmission distance.

The wireless LAN information management portion 336 receives the wireless LAN congestion information from the wireless LAN management servers 221 and 222 (step S2102). Next, the wireless LAN information management portion 336 writes the wireless LAN position information received in step S2102 to the wireless LAN information storage portion 337 (step S2103). In addition, the wireless LAN information management portion 336 finishes a series of wireless LAN congestion information acquisition processes.

Wireless LAN Congestion Information Table

FIG. 22 is a diagram illustrating an example of a wireless LAN congestion information table. The wireless LAN information storage portion 337 stores, for example, a wireless LAN congestion information table 2200 illustrated in FIG. 22. The wireless LAN congestion information table 2200 is a table including wireless LAN congestion information of each wireless LAN.

The wireless LAN congestion information table 2200 includes items "wireless LAN name", "maximal number of terminals", "current number of terminals", "maximal communication rate [Mbps]", "current communication speed [Mbps]", and "maximal transmission distance [m]". These items are respectively the same as, for example, the items illustrated in FIG. 9.

As mentioned above, according to the radio base station 211 according to Embodiment 2, by using congestion information of a wireless LAN which is a connection destination candidate of the mobile terminal 240, it is possible to connect the mobile terminal 240 to a wireless LAN in a case where communication of the wireless LAN which is a connection destination candidate is not in a congestion state. Accordingly, it is possible to offload communication of the mobile terminal 240 to a wireless LAN and to minimize deterioration in communication quality of the mobile terminal 240 due to the offloading. In addition, in a case where a bearer type of a call according to a communication request is a bearer type in which switching to a wireless LAN is not recommended, a wireless LAN switching process of the mobile terminal 240 is not made to be performed.

Embodiment 3

In relation to Embodiment 3, parts different from Embodiment 2 will be described.

Figure 23A:
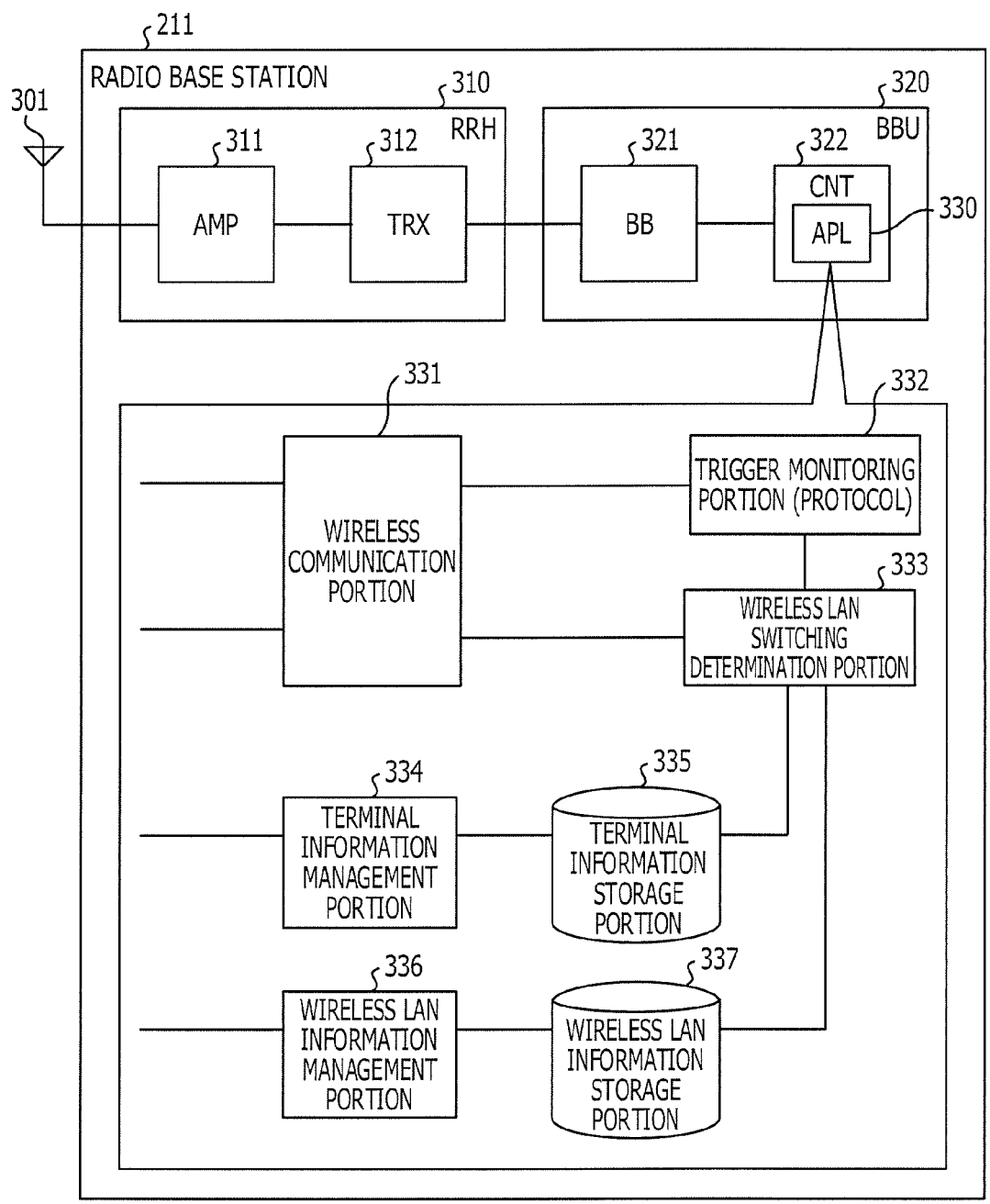
FIG. 23A is a diagram illustrating an example of a radio base station according to Embodiment 3.
Figure 23B:
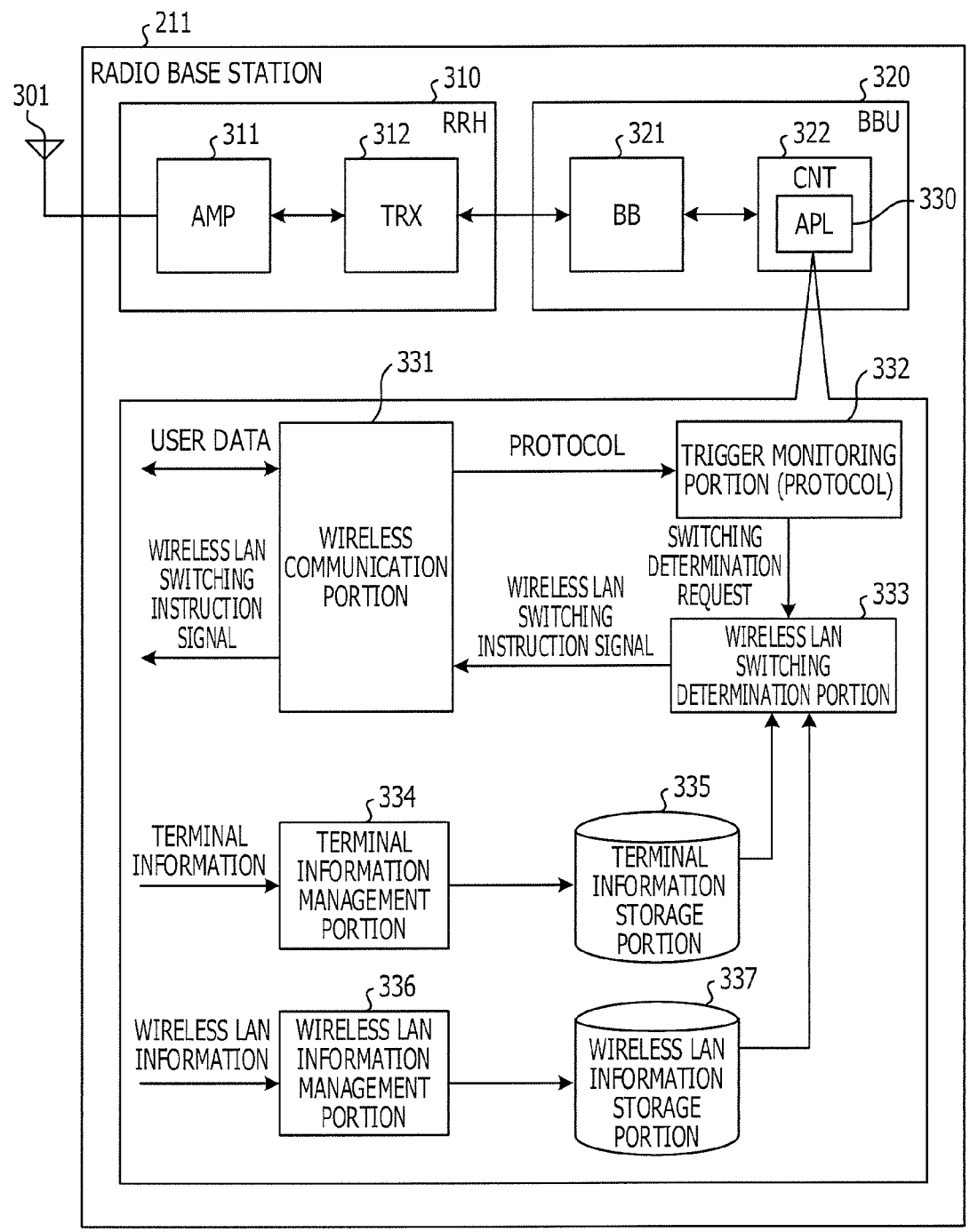
FIG. 23B is a diagram illustrating an example of a flow of information in the communication system illustrated in FIG. 23A.

FIG. 23A is a diagram illustrating an example of a radio base station according to Embodiment 3. FIG. 23B is a diagram illustrating an example of a flow of information in the radio base station illustrated in FIG. 23A. Illustrated in FIGS. 23A and 23B, the same parts as the parts illustrated in FIGS. 3A and 3B are given the same reference numeral, and description thereof will not be repeated.

In Embodiment 3, the trigger monitoring portion 332 monitors a protocol of communication with the mobile terminal 240 performed by the wireless communication portion 331 based on a header part of a communication packet of the communication with the mobile terminal 240 performed by the wireless communication portion 331. In addition, the trigger monitoring portion 332 sends a switching determination request to the wireless LAN switching determination portion 333 when communication using a predetermined protocol is detected. The predetermined protocol is, for example, a real time streaming protocol (RTSP).

Protocol Monitoring Process

Figure 24:
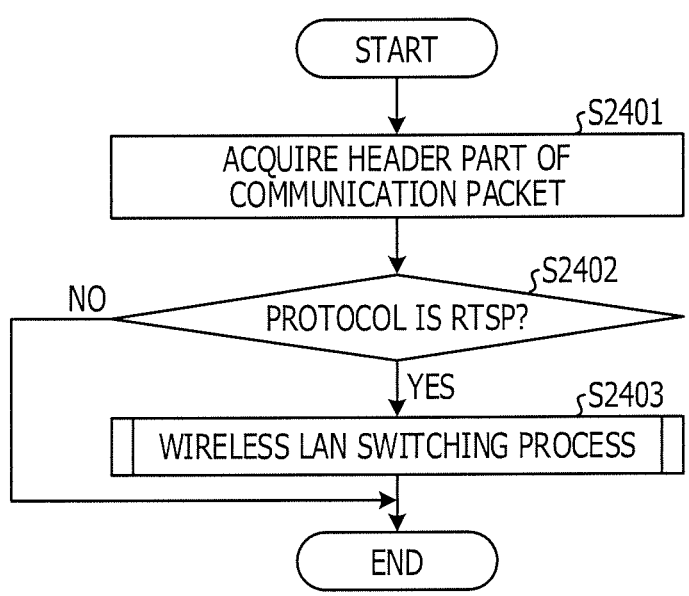
FIG. 24 is a flowchart illustrating an example of a protocol monitoring process.

FIG. 24 is a flowchart illustrating an example of a protocol monitoring process. The radio base station 211 repeatedly performs, for example, each step illustrated in FIG. 24. First, the radio base station 211 acquires a header part of a communication packet of communication with the mobile terminal 240 performed by the wireless communication portion 331 (step S2401). Step S2401 is performed by, for example, the trigger monitoring portion 332.

Next, the radio base station 211 determines whether or not a protocol of the communication with the mobile terminal 240 performed by the wireless communication portion 331 is an RTSP based on the header part acquired in step S2401 (step S2402). Step S2402 is performed by, for example, the trigger monitoring portion 332.

If the protocol is not an RTSP in step S2402 (step S2402: No), the radio base station 211 finishes a series of monitoring processes without performing a wireless LAN switching process. In this case, the mobile terminal 240 continues to perform communication via the radio base station 211.

If the protocol is an RTSP in step S2402 (step S2402: Yes), the radio base station 211 performs a wireless LAN switching process (step S2403), and finishes a series of monitoring processes. Step S2403 is performed by, for example, the wireless LAN switching determination portion 333. The wireless LAN switching process in step S2403 is the same as, for example, the wireless LAN switching process illustrated in FIG. 7.

Due to the above-described respective steps, it is possible to perform the wireless LAN switching process with a communication request from the mobile terminal 240 as a trigger. In addition, in a case where a protocol of communication is an RTSP which has to have a real time property, a wireless LAN switching process of the mobile terminal 240 is not made to be performed.

As mentioned above, according to the radio base station 211 according to Embodiment 3, by using congestion information of a wireless LAN which is a connection destination candidate of the mobile terminal 240, it is possible to connect the mobile terminal 240 to a wireless LAN in a case where communication of the wireless LAN which is a connection destination candidate is not in a congestion state. Accordingly, it is possible to offload communication of the mobile terminal 240 to a wireless LAN and to minimize deterioration in communication quality of the mobile terminal 240 due to the offloading. In addition, in a case where a communication protocol is a protocol in which switching to a wireless LAN is not recommended, a wireless LAN switching process of the mobile terminal 240 is not made to be performed.

Configuration in Which Control Device is Realized by Management Server

In the above-described respective embodiments, a description has been made of a case where the control device 110 illustrated in FIGS. 1A and 1B is realized by the radio base station 211, but the control device 110 may be realized by the management server 212.

Process in Communication System

FIG. 25 is a sequence diagram illustrating an example of a process in the communication system. In a case where the control device 110 is realized by the management server 212, for example, each step illustrated in FIG. 25 is performed in the communication system 200. In the example illustrated in FIG. 25, the mobile terminal 240 is assumed to be currently connected to the radio base station 211. In addition, in the example illustrated in FIG. 25, a description will be made of a case where connection destination candidates of the mobile terminal 240 are the access points 231 and 232.

Steps S2501 to S2505 illustrated in FIG. 25 are the same as steps S401 to S405 illustrated in FIG. 4. However, in step S2501, the management server 212 receives terminal information from the mobile terminal 240 via the radio base station 211. In addition, in step S2504, the management server 212 receives wireless LAN information from the wireless LAN management server 221.

After step S2505, the radio base station 211 transmits a communication request notification for notifying that there is a communication request from the mobile terminal 240, to the management server 212 (step S2506). Next, the management server 212 selects a wireless LAN which is a connection destination of wireless LANs of the access points 231 and 232 based on received respective information pieces (step S2507). In the example illustrated in FIG. 25, in step S2507, the wireless LAN of the access point 232 is assumed to be selected.

Next, the management server 212 transmits a wireless LAN switching instruction signal for instruction of connection to the wireless LAN of the access point 232, to the mobile terminal 240 via the radio base station 211 (step S2508). Next, the mobile terminal 240 makes a request for connection to the access point 232 (step S2509). Accordingly, a communication path of the mobile terminal 240 is switched from the radio base station 211 to the access point 232, and the mobile terminal 240 starts communication according to the communication request in step S2505, via the wireless LAN of the access point 232.

As mentioned above, according to the management server 212 illustrated in FIG. 25, by using congestion information of a wireless LAN which is a connection destination candidate of the mobile terminal 240, it is possible to connect the mobile terminal 240 to a wireless LAN in a case where communication of the wireless LAN which is a connection destination candidate is not in a congestion state. Accordingly, it is possible to offload communication of the mobile terminal 240 to a wireless LAN and to minimize deterioration in communication quality of the mobile terminal 240 due to the offloading.

As described above, according to the control device, the control method, and the communication system, it is possible to determine whether or not to switch a communication path of a mobile terminal from a mobile communication network to a wireless LAN in consideration of a movement speed of the mobile terminal, circumstances of the wireless LAN, or the like. Accordingly, it is possible to minimize deterioration in communication quality due to switching to a wireless LAN.

For this reason, for example, even if a user turns off a wireless LAN function of a mobile terminal, in a case where the mobile terminal can be connected to a wireless LAN with high communication quality, the wireless LAN function is automatically turned on for connection to the wireless LAN, so as to offload traffic to the wireless LAN. In addition, it is possible to minimize power consumption of a mobile terminal as compared with, for example, a case where the wireless LAN function is turned on at all times.

For example, in the related art, since switching is performed without checking congestion circumstances of an access point of a wireless LAN which is a switching destination, there is a case where a communication rate is reduced, which thus influences convenience of a mobile terminal. In addition, since movement circumstances of a mobile terminal is not taken into consideration, there is a case where, after switching to a wireless LAN is performed, a mobile terminal has already exceeded an effective communication range of the wireless LAN which is a switching destination, and thus a communication rate is reduced or communication is unable to be performed.

In contrast, according to the above-described respective embodiments, since an instruction of switching to a wireless LAN is performed after congestion circumstances of the wireless LAN which is a switching destination is taken into consideration, it is possible to minimize a reduction in a communication rate after the switching of a communication path and thus to minimize deterioration in convenience of a mobile terminal. In addition, since an instruction of switching to a wireless LAN is performed after movement circumstances of a mobile terminal is taken into consideration, it is possible to avoid a communication rate being reduced or communication being unable to be performed due to the mobile terminal exceeding an effective communication range of the wireless LAN which is a switching destination after the mobile terminal moves, and thus to minimize deterioration in convenience of the mobile terminal.

In addition, according to the above-described respective embodiments, it is possible to determine a bearer type when a bearer is set, or to determine wireless LAN switching before real time protocol communication starts. For this reason, it is possible to switch a communication path before packet data communication is performed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. A control device comprising:
a memory; and
a processor coupled to the memory and configured to:
acquire congestion information indicating a congestion state of communication of wireless local area networks (LANs) which are connection destination candidates of a mobile terminal configured to switch a state thereof between a first state and a second state, in the first state the mobile terminal being wirelessly connected to a radio base station of a mobile communication network and not performing a detection operation of a wireless LAN among the wireless LANs, and in the second state the mobile terminal performing the detection operation and being wirelessly connected to a detected wireless LAN,
determine when the acquired congestion information satisfies a given condition;
acquire movement speed information indicating a movement speed of the mobile terminal; and
perform switching control for switching a state of the mobile terminal from the first state to the second state when both the congestion information is determined to satisfy the given condition and the movement speed of the mobile terminal is less than a given movement speed, by transmitting a control signal, to trigger the switching, via the base station to the mobile terminal.

2. The control device according to claim 1,
wherein the processor is configured not to perform the switching control when the movement speed indicated by the movement speed information is equal to or higher than the given movement speed, even when the congestion information is determined to satisfy the given condition.

3. The control device according to claim 1,
wherein the processor is configured to notify the mobile terminal of a wireless LAN which is selected from among the wireless LANs which are connection destination candidates based on the congestion information in the switching control, so that the mobile terminal is wirelessly connected to the selected wireless LAN.

4. The control device according to claim 1,
wherein the processor is configured to perform the switching control when there is a communication request from the mobile terminal to the radio base station and the congestion information is determined to satisfy the given condition, so that the mobile terminal makes a request for communication with the wireless LAN.

5. The control device according to claim 1,
wherein the congestion information includes connection state information indicating a difference between a maximal number of mobile terminals which enable to be simultaneously connected to the wireless LAN which is a connection destination candidate and the number of mobile terminals which are currently connected to the wireless LAN which is a connection destination candidate, and
wherein the processor is configured to perform the switching control when the connection state information satisfies a given condition.

6. The control device according to claim 1,
wherein the congestion information includes a band state information indicating a difference between a maximal communication band of the wireless LAN which is a connection destination candidate and a communication band which is currently used by the wireless LAN which is a connection destination candidate, and
wherein the processor is configured to perform the switching control when the band state information satisfies a given condition.

7. The control device according to claim 1,
wherein the processor is configured to acquire distance information indicating a difference between a distance between the wireless LAN which is a connection destination candidate and the mobile terminal and a wireless transmission distance of the wireless LAN which is a connection destination candidate, and
wherein the processor is configured to perform the switching control when the distance information satisfies a given condition.

8. The control device according to claim 1,
wherein the processor is configured to perform the switching control when a bearer type of communication between the radio base station and the mobile terminal is a given bearer type, and the congestion information is determined to satisfy the given condition.

9. The control device according to claim 1,
wherein the processor is configured to perform the switching control when a protocol of communication between the radio base station and the mobile terminal is a given protocol, and the congestion information is determined to satisfy the given condition.

10. A control method comprising:
acquiring congestion information indicating a congestion state of communication of wireless local area networks (LANs) which are connection destination candidates of a mobile terminal configured to switch a state thereof between a first state and a second state, in the first state the mobile terminal being wirelessly connected to a radio base station of a mobile communication network and not performing a detection operation of a wireless LAN among the wireless LANs, and in the second state the mobile terminal performing the detection operation and being wirelessly connected to a detected wireless LAN;
determining when the acquired congestion information satisfies a given condition;
acquiring movement speed information indicating a movement speed of the mobile terminal; and
performing, by a processor, switching control for switching a state of the mobile terminal from the first state to the second state when both the congestion information is determined to satisfy the given condition and the movement speed of the mobile terminal is less than a given movement speed, by transmitting a control signal, to trigger the switching, via the base station to the mobile terminal.

11. A communication system comprising:
a mobile terminal configured to switch a state thereof between a first state and a second state, in the first state the mobile terminal being wirelessly connected to a radio base station of a mobile communication network and not performing a detection operation of a wireless local area network (LAN) among wireless LANs, and in the second state the mobile terminal performing the detection operation and being wirelessly connected to a detected wireless LAN; and
a control device configured to:
acquire congestion information indicating a congestion state of communication of the wireless LANs which are connection destination candidates of the mobile terminal,
determine when the acquired congestion information satisfies a given condition,
acquire movement speed information indicating a movement speed of the mobile terminal; and
perform switching control for switching a state of the mobile terminal from the first state to the second state when both the congestion information is determined to satisfy the given condition and the movement speed of the mobile terminal is less than a given movement speed, by transmitting a control signal, to trigger the switching, via the base station to the mobile terminal.

* * * * *